United States Patent [19]
Onaka et al.

[11] Patent Number: 5,471,336
[45] Date of Patent: Nov. 28, 1995

[54] COLD START CONTROL SYSTEM AND METHOD FOR USE IN COHERENT LIGHTWAVE COMMUNICATIONS SYSTEM

[75] Inventors: Hiroshi Onaka; Hideyuki Miyata; Takao Naito, all of Kawasaki, Japan

[73] Assignee: Fujitsu Limited, Kawasaki, Japan

[21] Appl. No.: 928,101

[22] Filed: Aug. 11, 1992

[30] Foreign Application Priority Data

Aug. 14, 1991 [JP] Japan .................... 3-204489

[51] Int. Cl.$^6$ ................................. H04N 5/50
[52] U.S. Cl. ............................. 359/191; 359/194
[58] Field of Search ........................ 359/119, 191, 359/188, 189, 86, 154, 237; 375/192, 193, 194, 195, 303, 273, 317, 334

[56] References Cited

U.S. PATENT DOCUMENTS

| | | | |
|---|---|---|---|
| 5,191,614 | 3/1993 | LeCong | 359/119 |
| 5,223,967 | 6/1993 | Udd | 359/119 |

FOREIGN PATENT DOCUMENTS

| | | | |
|---|---|---|---|
| 0411566 | 2/1991 | European Pat. Off. | |
| 61-46636 | 3/1986 | Japan | |
| 62-47229 | 2/1987 | Japan | |

OTHER PUBLICATIONS

"Carrier Acquisition and Tracking for Coherent Systems," T. Large et al., IEE Colloquium on Coherent Optical Communications, Jun. 27, 1990, London, pp. 12/1–12/7.

"Tunable Optical Heterodyne Receiver for Coherent FDM Broadcasting Systems," S. Yamazaki et al., 14th European Conference on Optical Communication, Sep. 1988, Brighton, G.B., pp. 86–89.

Primary Examiner—Douglas W. Olms
Assistant Examiner—Dang Ton
Attorney, Agent, or Firm—Staas & Halsey

[57] ABSTRACT

A cold start control system and method for use in a coherent lightwave communications system, in which received signal light is mixed with local light to obtain an IF signal. In the cold start control, the frequency of the local light and/or the frequency of the signal light is swept in the state of the system capable of detecting the IF signal and discrimination between the real/image states and relative correction are made, and then, an AFC operation is started.

17 Claims, 22 Drawing Sheets

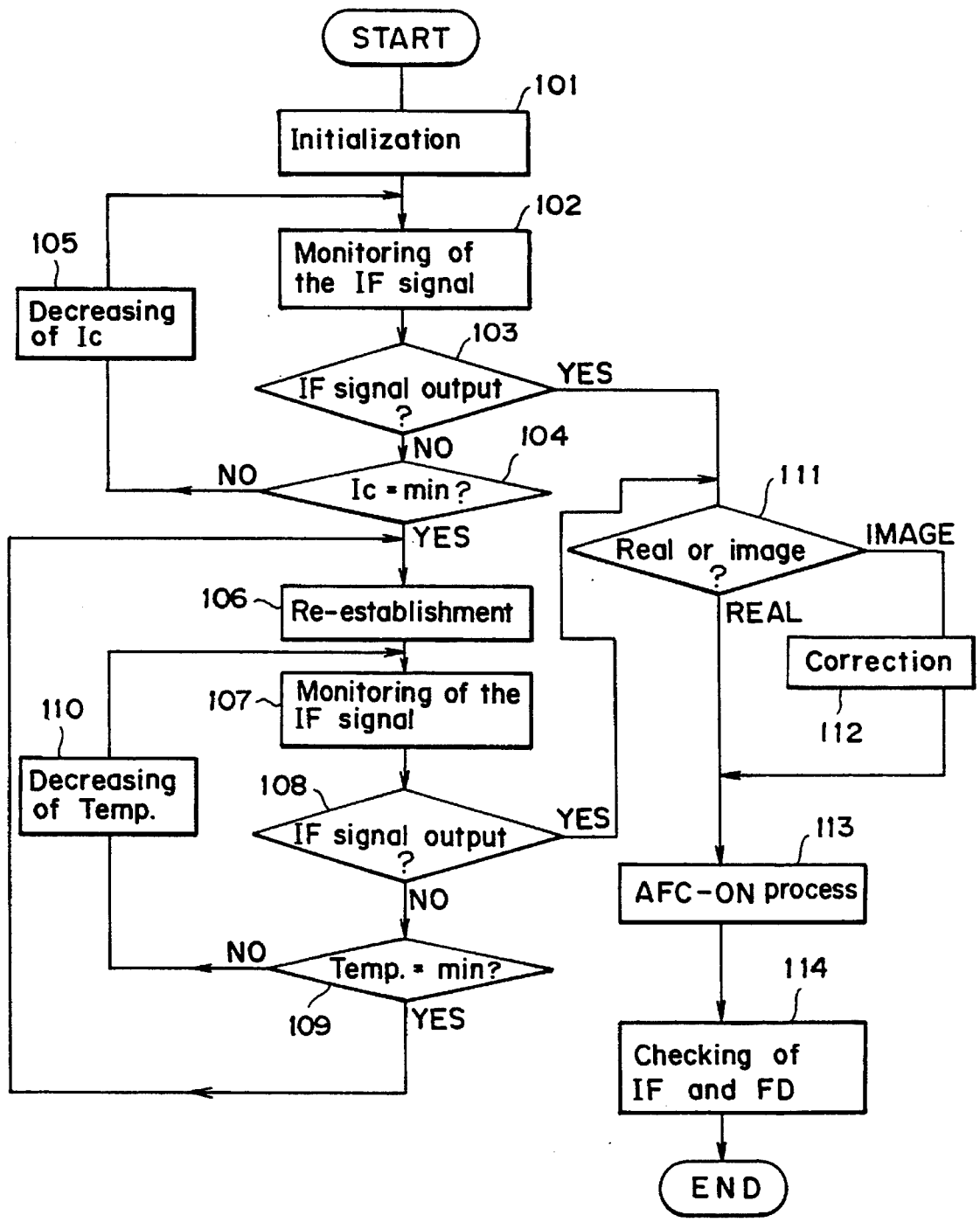

Real

Image

COLD START CONTROL SYSTEM AND METHOD FOR USE IN COHERENT LIGHTWAVE COMMUNICATIONS SYSTEM

BACKGROUND OF THE INVENTION

The present invention relates to a cold start control system and method for use in a coherent lightwave communications system.

The coherent lightwave communications system can improve the sensitivity in reception by 10 to 20 dB over the conventional intensity modulation/direct detection (IM/DD) and facilitates optical frequency-division multiplex transmission. Therefore, the system is expected to be put to practical use in large capacity and long distance transmissions.

In the heterodyne receiver generally used in the coherent lightwave communications system, it is arranged such that a local light beam is mixed with a received signal light beam to obtain an intermediate-frequency signal (IF signal). The mixing of the signal light and the local light can be achieved by optically detecting the signal light and local light with a photodiode or the like having a nonlinear detecting characteristic. The IF signal thus obtained is demodulated to a base band signal.

Since the frequency of the IF signal corresponds to the difference between the frequency of the signal light and the frequency of the local light, when the center frequency of the signal light and/or the frequency of the local light varies with changes in ambient conditions or the like, the center frequency of the IF signal also varies. A variation in the center frequency of the IF signal injures normal demodulation. Therefore, in the heterodyne receiver, automatic frequency control (AFC) is executed, in general, to keep the center frequency of the IF signal constant.

The capture range of the AFC circuit is around 10 GHz at most. Against this, the oscillation frequency of a semiconductor laser serving as the light source of the signal light or the local light has a variation of several hundred GHz as a difference among individual products. Therefore, in cold starting a system, it is required that the IF signal be controlled to come within the capture range of the AFC circuit.

SUMMARY OF THE INVENTION

An object of the present invention is to provide a cold start control system and method capable of automatically starting a coherent lightwave communications system.

According to an aspect of the present invention, there is provided a cold start control system for use in a coherent lightwave communications system comprising optical detection means for mixing signal light and local light to output an intermediate-frequency signal, automatic frequency control means for controlling the intermediate-frequency signal from the optical detection means such that the center frequency of the intermediate-frequency signal is kept constant, AFC control means for selectively switching the automatic frequency control means between an operating state and a nonoperating state, sweep means for monitoring the presence or absence of the intermediate-frequency signal output from the optical detection means and sweeping at least one selected from the frequency of the signal light and the frequency of the local light, decision means for stopping the sweep of the frequency by the sweep means when it is detected that an intermediate-frequency signal is output from the optical detection means and deciding the relative frequency position between the signal light and the local light the relative frequency position being indicative of which of the frequency of the signal light and the frequency of the local light is higher than the other one and correction means for correcting at least one selected from the frequency of the signal light and the frequency of the local light when the relative frequency position decided by the decision means is not in agreement with a predetermined relative frequency position; wherein the AFC control means, when the relative frequency position decided by the decision means is in agreement with the predetermined relative frequency position or when the frequency is corrected by the correction means, brings the automatic frequency control means from its nonoperating state to its operating state.

According to another aspect of the present invention, there is provided a cold start control method for use in a coherent lightwave communications system in which received signal light is mixed with local light to obtain an intermediate-frequency signal comprising the steps of sweeping at least one selected from the frequency of the local light and the frequency of the signal light in the state of the system capable of detecting the intermediate-frequency signal, deciding the relative frequency position between the local light and the signal light when an intermediate-frequency signal is detected, correcting at least one selected from the frequency of the local light and the frequency of the signal light when the relative frequency position obtained in the deciding step is not in agreement with a predetermined relative frequency position and starting automatic frequency control when the relative frequency position obtained in the deciding step is in agreement with the predetermined relative frequency position or when the correction of frequency is made in the correcting step.

Specifically, when the system or method of the present invention is applied to a heterodyne receiver for a coherent lightwave communications system, the frequency of the local light is controlled such that the center frequency of the intermediate-frequency signal is kept constant, the frequency of the local light is swept, and the frequency of the local light is corrected.

The above and other objects, features and advantages of the present invention and the manner of realizing them will become more apparent, and the invention itself will best be understood from the following description and appended claims, with reference to the attached drawings showing some preferred embodiments of the invention.

BRIEF DESCRIPTION OF THE DRAWINGS

FIG. 5 is a flow chart showing the outline of the cold start control in a first embodiment of the present invention;

DESCRIPTION OF THE PREFERRED EMBODIMENTS

An embodiment of the present invention will be described below with reference to the accompanying drawings.

Figure 1:
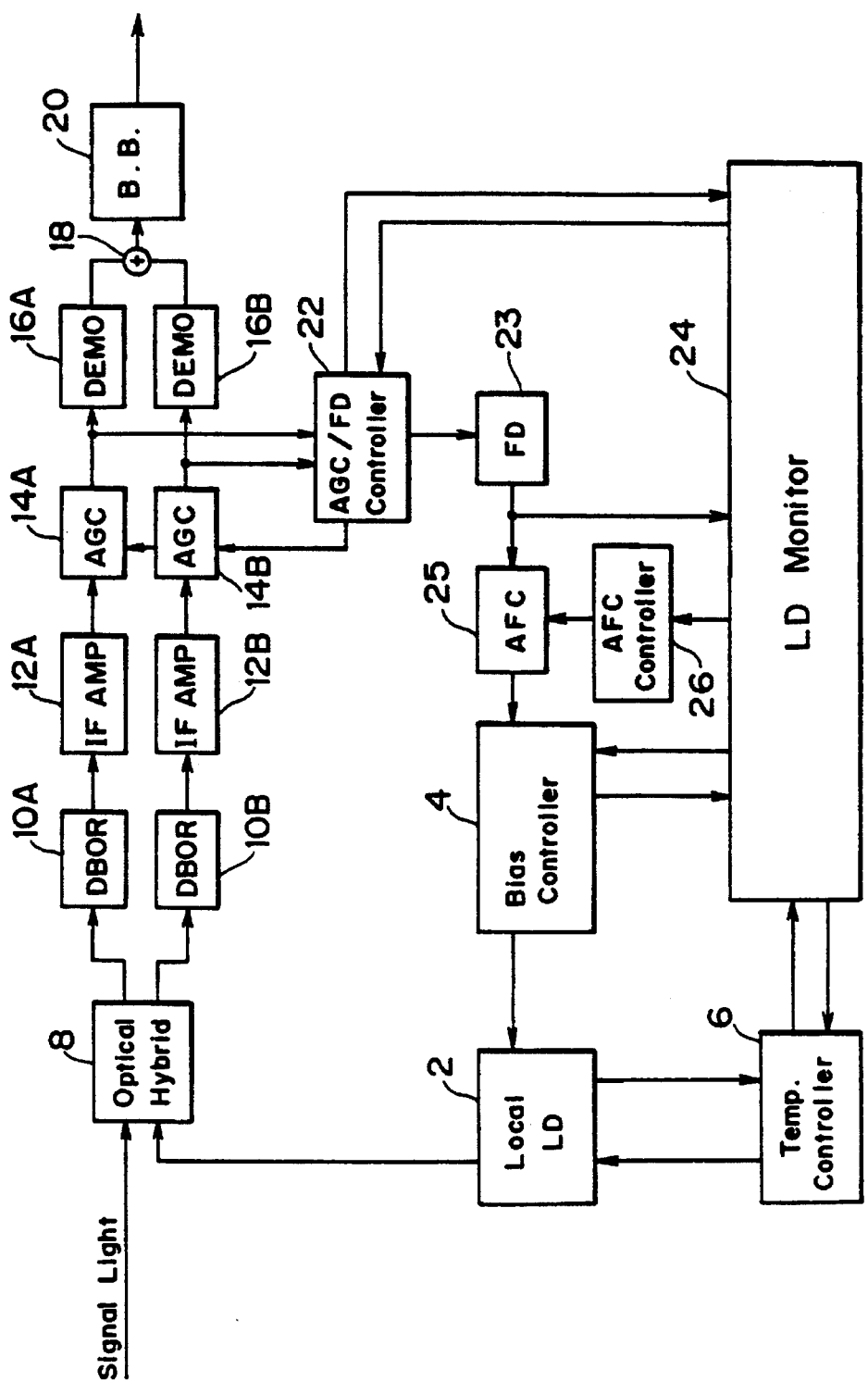
FIG. 1 is a block diagram of the main portion of a heterodyne receiver to which the present invention is applicable.

FIG. 1 is a block diagram of the principal portion of a heterodyne receiver to which the present invention is applicable.

Reference numeral 2 denotes a local laser diode (LD) outputting local light, of which the structure and operating characteristics will be described later. The local LD 2 is supplied with a bias current, controlled by a bias controller 4, and controlled for temperature by a temperature controller 6. Reference numeral 8 denotes an optical hybrid to which the received signal light and the local light from the local LD 2 are input. This optical hybrid 8 is structured as usual with an optical coupler and a polarization beam splitter. In the present receiver in which the polarization diversity method is used, the optical hybrid 8 outputs the signal light and local light corresponding to one of the polarization components whose planes of polarization are at right angles to each other and the signal light and local light corresponding to the other of the polarization components.

The signal light and local light corresponding to the one of the polarization components are converted into an electric signal (IF signal) in a DBOR (double balanced optical receiver) 10A, and this IF signal is amplified by an IF amplifier 12A and supplied to a demodulator 16A through an AGC circuit 14A. The signal light and local light corresponding to the other of the polarization components are also converted into an IF signal in a DBOR 10B, and this IF signal is amplified by an IF amplifier 12B and supplied to a demodulator 16B through an AGC circuit 14B. The demodulated signals from the demodulators 16A and 16B are added together in an adder 18 and supplied to a base band circuit 20.

Reference numeral 22 denotes an AGC/FD controller to which the IF signals corresponding to both of the polarization components are input. This circuit controls the gain in the AGC circuits 14A and 14B and, further, supplies the IF signal to a frequency discriminator 23 and an LD monitor 24. The frequency discriminator 23 supplies an error signal corresponding to the difference between the frequency of the supplied IF signal and a desired frequency (e.g., 5 GHz) to an AFC circuit 25 and the LD monitor circuit 24. An AFC controller 26 switches the AFC circuit 25 between its operating state and its nonoperating state according to a signal from the LD monitor circuit 24. The AFC circuit 25, in its operating state, supplies a control signal to a bias controller 4 so that the center frequency of the IF signal is brought into agreement with the desired frequency. As to circuits peripheral to the LD monitor 24, detailed descriptions will be given later.

Figure 2:
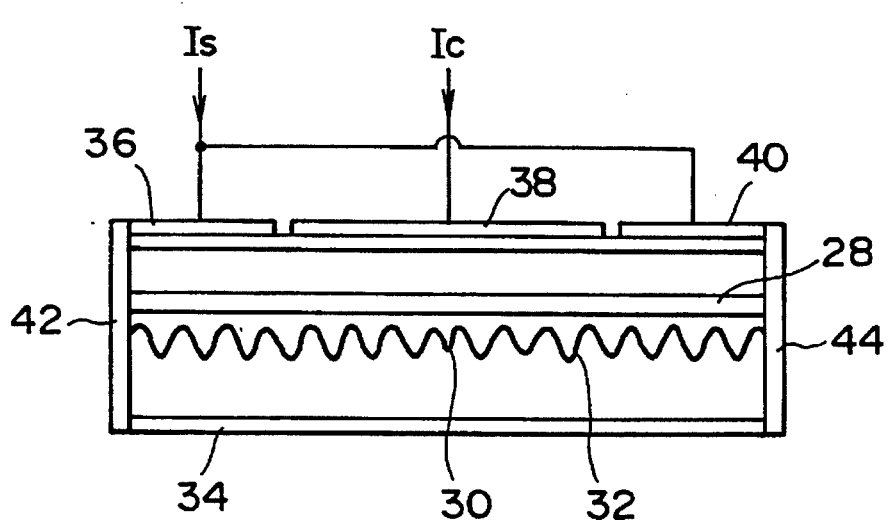
FIG. 2 is a schematic diagram showing a structure of a laser diode (LD) usable as the local LD in FIG. 1.

FIG. 2 is a schematic diagram showing the structure of an LD used for the local LD. This LD is structured by forming a shallow grating 32 having a ¼-wavelength phase shift point 30 virtually in the center of its length on a semiconductor laser element of an FBH-DFB type having a long active layer and, further, forming a common electrode 34 on the back side and forming electrodes 36, 38, and 40 split in three along the length on the front side. In the following description, the current supplied to the center electrode 38 on the front side is called the Ic bias and the current supplied to the side electrodes 36 and 40 is called the Is bias. Reference numerals 42 and 44 denote reflection preventing films formed on both ends of the active layer 28, respectively.

Figure 3:
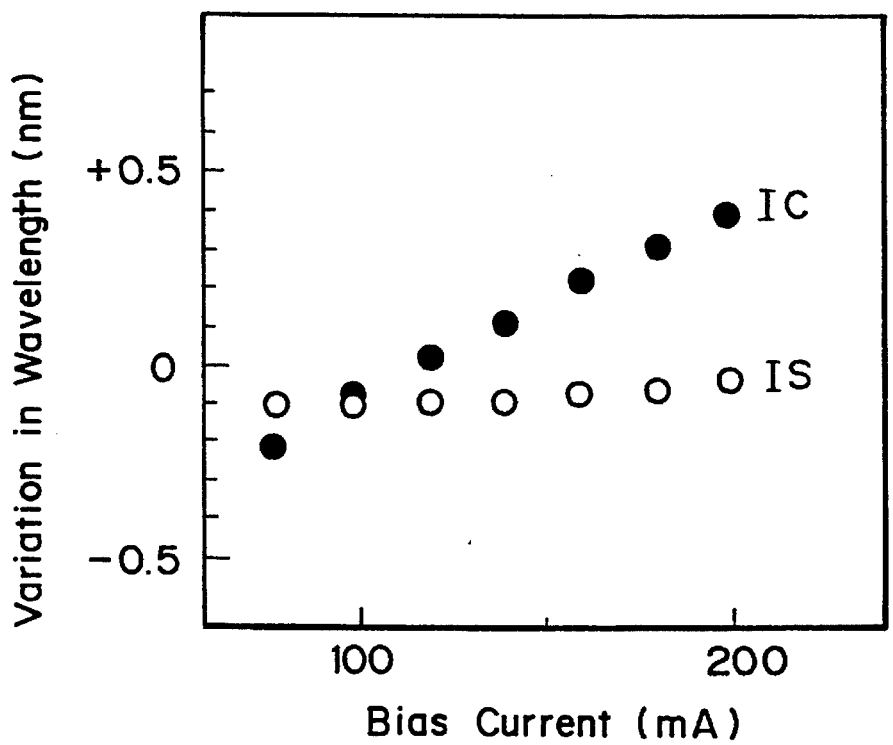
FIG. 3 is a graph showing relationships between variations in the oscillation wavelength and the bias currents in the LD of FIG. 2.

FIG. 3 is a graph showing relationships between variations in oscillation wavelength and the bias currents (Ic, Is) in the LD of FIG. 2. The variation in oscillation wavelength against the change in the Ic bias is greater than the variation in the oscillation wavelength against the change in the Is bias by approximately one digit. Therefore, the frequency of the local light can be swept by controlling the Ic bias. As can be seen in FIG. 3, if the Ic bias is controlled in APC (automatic power control), the wavelength of the output light is changed. Therefore by using the Is bias, APC (automatic power control) can be performed without affecting the AFC loop.

Figure 4:
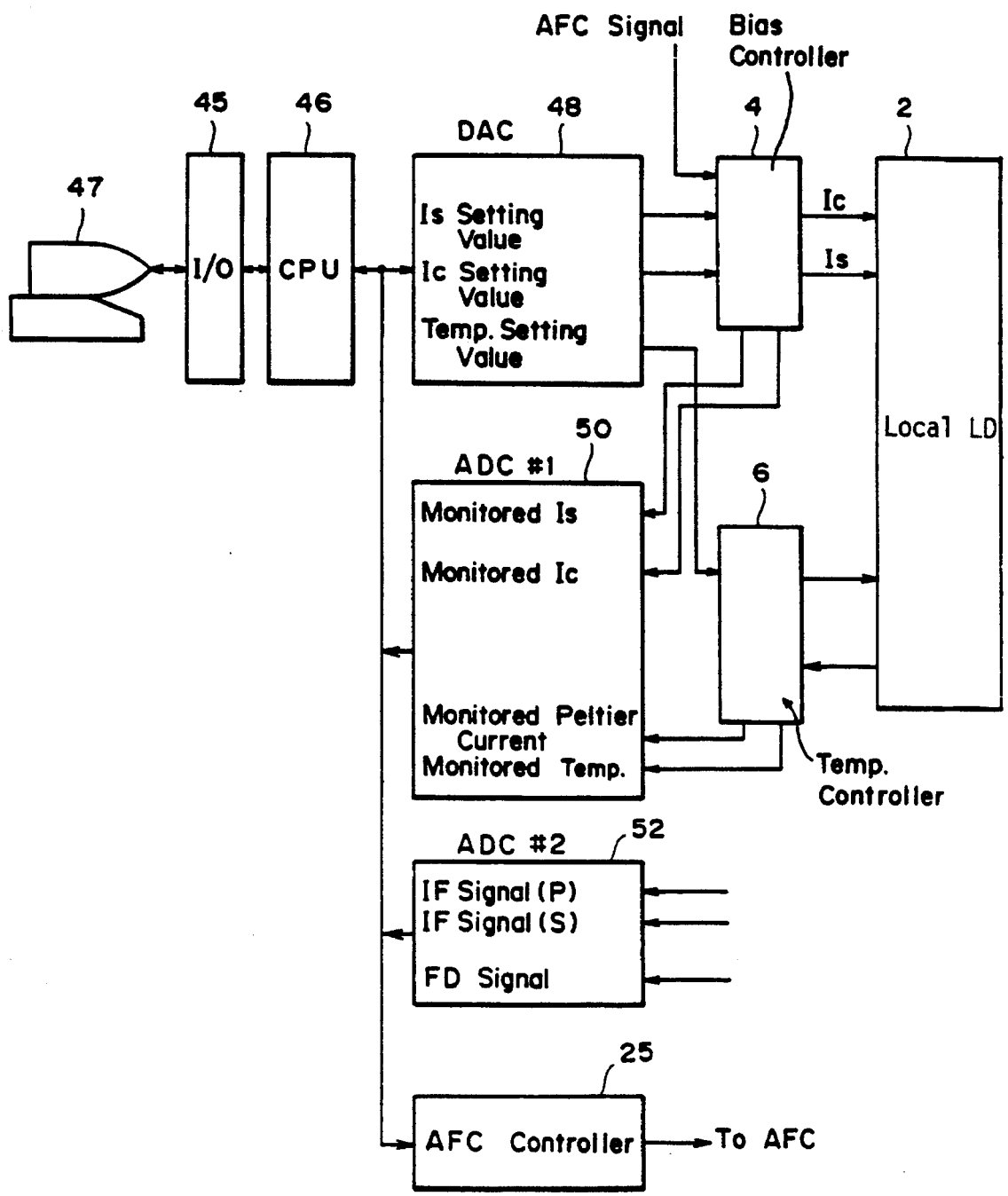
FIG. 4 is a block diagram of circuits peripheral to an LD monitor circuit in FIG. 1.

FIG. 4 is a block diagram of circuits peripheral to the LD monitor circuit. The items of monitoring and setting which are directly necessary for the cold start are monitoring of the IF signal output corresponding to one of the polarization components (P polarization), monitoring of the IF signal output corresponding to the other one of the polarization components (S polarization), monitoring of the output of the frequency discriminator, monitoring of the Ic bias, setting of the Ic bias, monitoring of the temperature of the local LD, and setting of the temperature of the local LD.

Reference numeral 46 denotes a CPU executing calculations according to prescribed programs. The CPU 46 includes a ROM (Read Only Memory) for storing programs and data tables for calculation, etc., and a RAM (Random Access Memory) for temporarily storing results of the calculations and the like. The CPU 46 is connected with terminals 47 through an I/O circuit 45. The terminals are used for setting initial values, displaying alarms, and the like.

The Is setting value and Ic setting value are supplied from the CPU 46 to the bias controller 4 through a DAC (Digital-to-Analog Converter) 48. The temperature setting value is supplied from the CPU 46 to the temperature controller 6 through the DAC 48. A control output from the temperature controller 6 is supplied to a Peltier element (electronic cooling element), not shown, for regulating the temperature of the local LD 2, and a signal from a thermistor, not shown, for detecting the temperature of the local LD 2, is input to the temperature controller 6. Monitored values of the Is bias and Ic bias from the bias controller 4 and the monitored values of the Peltier current and the controlled temperature from the temperature controller 6 are received by the CPU 46 through a first ADC (Analog-to-Digital Converter) 50. Monitored values of the IF signals and the monitored value of the frequency discrimination signal are received by the CPU 46 through a second ADC 52. As to the AFC circuit, in view of the control frequency range, an analog error signal from the frequency discriminator is directly fed back to the Ic bias and only the switching on/off of the AFC circuit is executed by software. The control drifts due to the temperature change from 0° C. to 70° C. were about 50 $\mu^A$ in the bias controller and about 0.02° C. in the temperature controller. No deterioration in the line width of the local LD was produced in the digital processing.

FIG. 5 is a flow chart showing the outline of the cold start control in a first embodiment of the present invention. When the driving condition of the local LD is preset so that the frequency of the local light comes within a predetermined range, there is a high possibility that the IF signal can be captured by e*sweeping only the Ic bias. Therefore, by sweeping only the Ic bias first, high speed capturing (in about 1 sec.) is made possible. If, at this time, the IF signal is not detected, the temperature then is changed in succession, such that the entire variable range is swept. Since a special frequency discriminator with a wide capture range is used, the frequency of the local light is swept in steps of 6 GHz. A more concrete description will be given below.

First, in the step 101, a self-diagnostic operation is performed and, at the same time, the Ic bias and the temperature are initialized. In the following step 102, monitoring of the IF signal output is performed and, in the step 103, it is decided whether or not an IF signal output is present. If the IF signal is present, the flow moves to the step 111. If the IF signal is not present, the flow advances to the step 104, in which case it is decided whether or not the Ic bias is at its lower limit. If the Ic bias is not at its lower limit, then; in the step 105, the Ic bias is decreased by a predetermined value and the flow returns to the step 102. When it is decided that the Ic bias is at its lower limit in the step 104, the Ic bias and the temperature are re-established (reset) in the step 106. Then, in the step 107, the IF signal output is monitored and, in the step 108, it is decided whether or not the IF signal output is present. When there is an IF signal output, the flow moves to the step 111. When there is no IF signal output, it is decided, in the following step 109, whether or not the temperature is at its lower limit. If the temperature is not at its lower limit, then, in the following step 110, the temperature is decreased by a predetermined value, and the flow returns to the step 107. Thereafter, the steps 107 to 110 are repeated. When it is decided that the temperature is the established minimum value in the step 109, the flow returns to the step 106, in which case the Ic bias and the temperature are re-established and, thereafter, the steps 107 to 110 are repeated.

In the step 111, it is decided as to which is higher of, the local light frequency or the signal light frequency. Namely, it is decided whether the IF signal on the real side is obtained or the IF signal on the image side is obtained. When the IF signal on the real side is obtained, the flow advances to the step 113. When the IF signal on the image side is obtained, the frequency of the local light is corrected by adjusting the Ic bias or temperature in the step 112, and then the flow advances to the step 113. In the step 113, a process for bringing the AFC circuit into its operating state is performed. In the following step 114, the IF signal output and the frequency discriminator output are checked and then the present flow is ended.

Figure 6A:
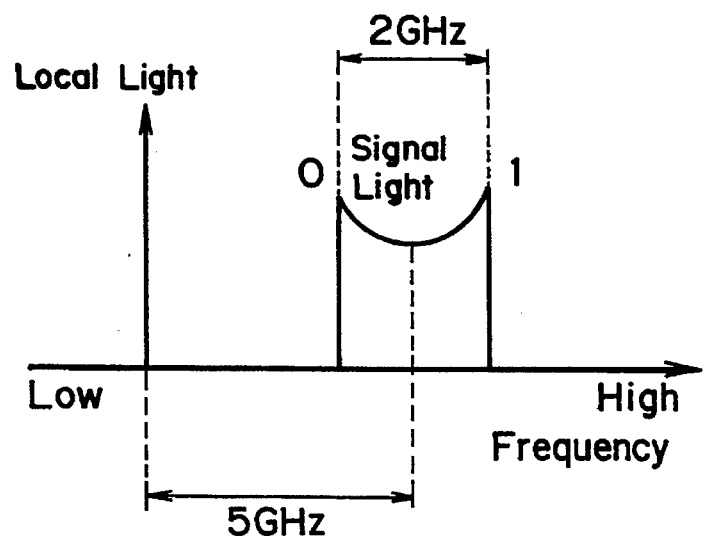
FIG. 6A and FIG. 6B are diagrams explanatory of relative signal positions between the signal light and the local light in the cases where an IF signal is obtained on the real side and on the image side, respectively.
Figure 6B:
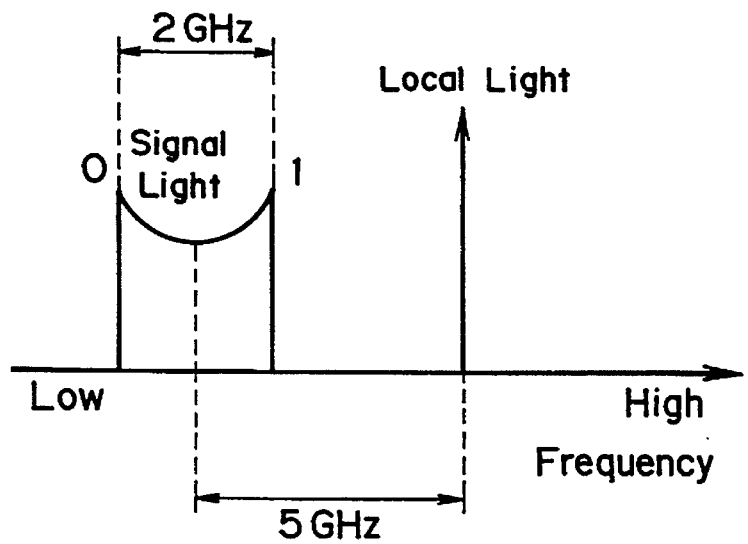

FIG. 6A and FIG. 6B are diagrams explanatory of relative frequency positions between the signal light and the local light in the cases where the IF signal is obtained on the real side and it is obtained on the image side, respectively. As shown in FIG. 6A, when the signal light is set on the high-frequency side (short-wavelength side) and the local light is set on the low-frequency side (long-wavelength side), an IF signal on the real side is obtained. Conversely, as shown in FIG. 6B, when the signal light is set on the low-frequency side (long-wavelength side) and the local light is set on the high-frequency side (short-wavelength side), an IF signal on the image side is obtained. The signal light is modulated by a digital signal with two states "0" and "1". The frequency difference between "0" and "1" in this example is set to 2 GHz. Further, the difference between the frequency of the local light and the center frequency of the signal light is set to 5 GHz.

Figure 7:
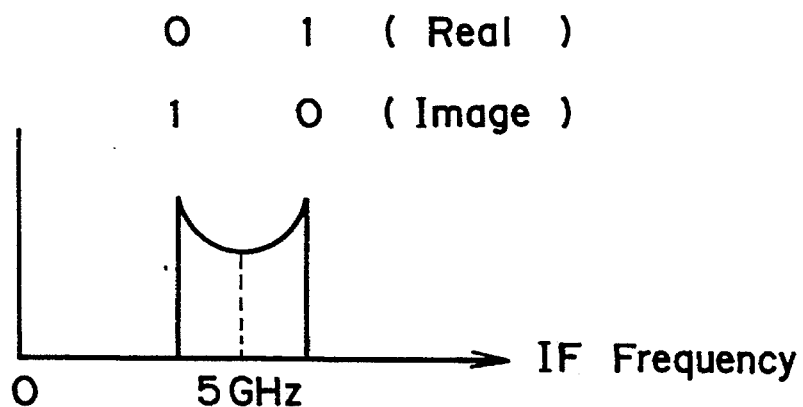
FIG. 7 is an explanatory diagram of the spectrum of an IF signal.

FIG. 7 is a diagram explanatory of the spectrum of an IF signal. When the IF signal on the real side is obtained, "0" and "1" are located on the low-frequency side and the high-frequency side, respectively. On the other hand, when the IF signal on the image side is obtained, "1" and "0" are located on the low-frequency side and the high-frequency side, respectively. When the Ic bias for the local LD is increased or the temperature of the local LD is raised, the frequency of the local LD is decreased. Conversely, when the Ic bias for the local LD is decreased or the temperature of the local LD is lowered, the frequency of the local LD is increased. As apparent from the description of FIG. 6A and FIG. 6B, if the frequency of the local light is decreased, the frequency of the IF signal increases when the IF signal on the real side is obtained, but the frequency of the IF signal decreases when the IF signal on the image side is obtained.

Figure 8:
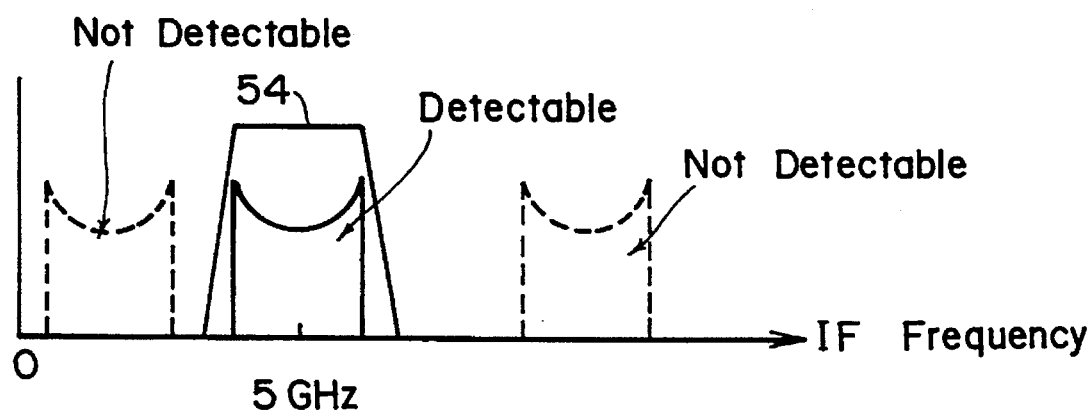
FIG. 8 is a diagram explanatory of a detectable range of an IF signal.

FIG. 8 is a diagram explanatory of the detectable range of an IF signal. Since the IF signal acquired by the ADC 52 (FIG. 4) has been passed through a bandpass filter having a predetermined passband, as indicated by numeral 54 in FIG. 8, the IF signal can be detected only when the same is within the passband 54. When the frequency of the IF signal is greatly deviated from the required value as in the initial state of the cold start, the IF signal will not be detected. Hence, when both of the IF signals corresponding to the P polarization and the S polarization are not detected, it means that the frequency of the local light or the center frequency of the signal light is greatly deviated from the required value. When at least the IF signal corresponding to either the P polarization or the S polarization is detected, it is known that the frequency of the light source is in the range close to the required value, though it is unclear whether the IF signal is on the real side or on the image side.

Figure 9:
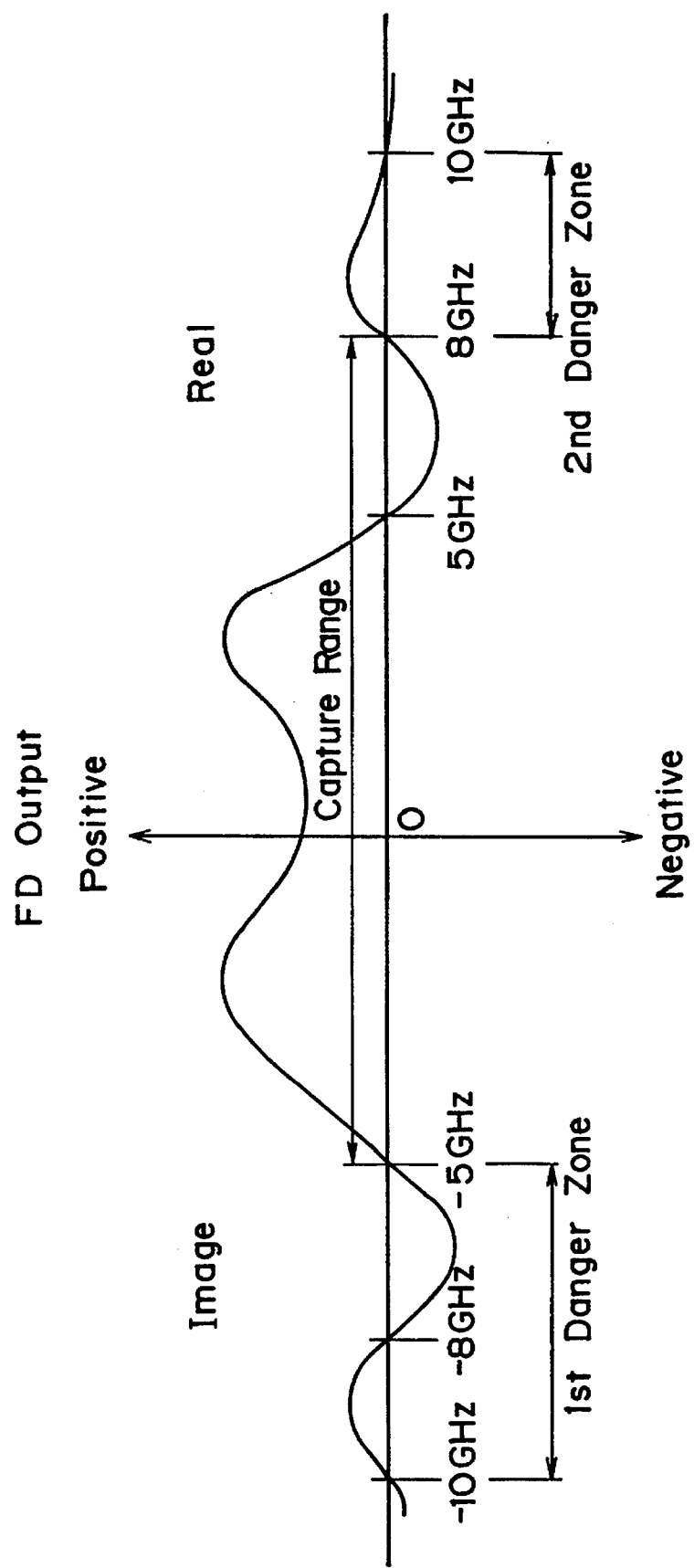
FIG. 9 is a diagram showing an example of characteristics of a frequency discriminator in FIG. 1.

FIG. 9 is a diagram showing the characteristics of the frequency discriminator used in the present embodiment. The axis of ordinate represents the output of the frequency discriminator and the axis of the abscissa represents the frequency. The region on the positive side of the frequency axis corresponds to the case where the IF signal on the real side is obtained, and the region on the negative side of the frequency axis corresponds to the case where the IF signal on the image side is obtained.

When the AFC operation is started, the Ic bias is adjusted so that the IF signal comes to the position where the output of the frequency discriminator becomes 0 V and the differential coefficient of the frequency discrimination curve becomes negative and, thereby, an IF signal with a constant frequency is obtained. Such points of stability exist at 5 GHz, −8 GHZ, and 10 GHz.

When the AFC operation is started, it offers no problem even if the frequency of the IF signal is somewhat apart from one of the points of stability, 5 GHz. For example, when the AFC operation is started in the state where the IF signal is at around 0 GHz (e.g., where the center frequency of the signal light and the frequency of the local light are equal), the Ic bias is adjusted so that the IF signal is stabilized at the point of stability on the real side, 5 GHz. In concrete terms, when the IF signal is within the range from −5 GHz to 8 GHz, the IF signal can be stabilized at 5 GHz by execution of the AFC operation. In other words, the capture range of this frequency discriminator is 13 GHz (from −5 GHz to +8 GHz). Incidentally, the frequency discriminating range of this frequency discriminator is 20 GHz (from −10 GHz to +10 GHz).

However, when the IF signal is within the range from −10 GHz to −5 GHz (a first danger zone) or when the IF signal is within the range from 8 GHz to 10 GHz (a second danger zone), the IF signal cannot be stabilized at the point of stability (5 GHz) even if the AFC is executed, but the IF signal is stabilized at a point of pseudo-stability (−8 GHz or 10 GHz). Therefore, it is desired that cold start adapted to such particular characteristics of the frequency discriminator be performed.

The sweep of the frequency of the local light can be achieved by changing the Ic bias or the temperature of the local LD. The sweep of the frequency of the local light may be performed continuously or may be performed stepwise, using discrete values. When performing the sweep by software using the CPU, the stepwise method is easier.

When the Ic bias is increased, the frequency of the local light varies toward the lower frequency side. An increase of 1 mA in the Ic bias brings about a decrease of 500 to 1000 MHz in the frequency of the local light. The variation in frequency for a unit change in current differs with individual LD elements. When the temperature setting of the local LD is increased, the frequency of the local light varies toward the lower frequency side. An increase of 1° C. in the temperature of the local LD brings about a decrease of approximately 10 GHz in frequency of the local light. The variation in frequency for a unit change in temperature does not differ so much with individual LD elements.

The approximate sweeping range of the local light in the cold start is as given below. Since the Ic bias is variable approximately 40 to 60 mA, the corresponding variable range of frequency of the local light is approximately 20 to 60 GHz (0.16 to 0.48 nm). Further, since the variable range of temperature of the local LD is approximately 5° C., the corresponding variable range of frequency of the local light is approximately 50 GHz (0.4 nm). Accordingly, when the frequency of the local light is swept stepwise in steps of approximately 6 GHz, for example, in the cold start, the sweep is achieved in 4 to 10 steps or so for the Ic bias and in 10 steps or so for the temperature setting.

When a heterodyne receiver is constructed, obtaining the IF signal on the real side is easier than obtaining the IF signal on the image side, in achieving compensation for wavelength dispersion in the optical fiber transmission line by means of a microwave circuit. In order to obtain the IF signal on the real side, it is necessary to set the frequency of the local light lower than the frequency of the signal light. Therefore, it is preferable to sweep the frequency of the local light from the low-frequency side to the high-frequency side. In the sweep of the frequency of the local light from the lower limit of the variable range, an IF signal on the image side is obtained only when an IF signal is obtained the moment the sweep has just been started. When an IF signal is obtained in the course of the sweep, the IF signal is always on the real side.

Although the frequency of the local light can be separately varied by changing either of the Ic bias and the temperature setting, the setting of the Ic bias can be completed in a relatively short time, while a considerable time is required when the temperature setting is changed before a steady state under the set temperature is reached. Therefore, in sweeping the frequency of the local light, it is preferable to adjust the Ic bias first, because the cold start can be achieved in a short time if the sweep is completed only by the adjustment of the Ic bias.

Figure 10:
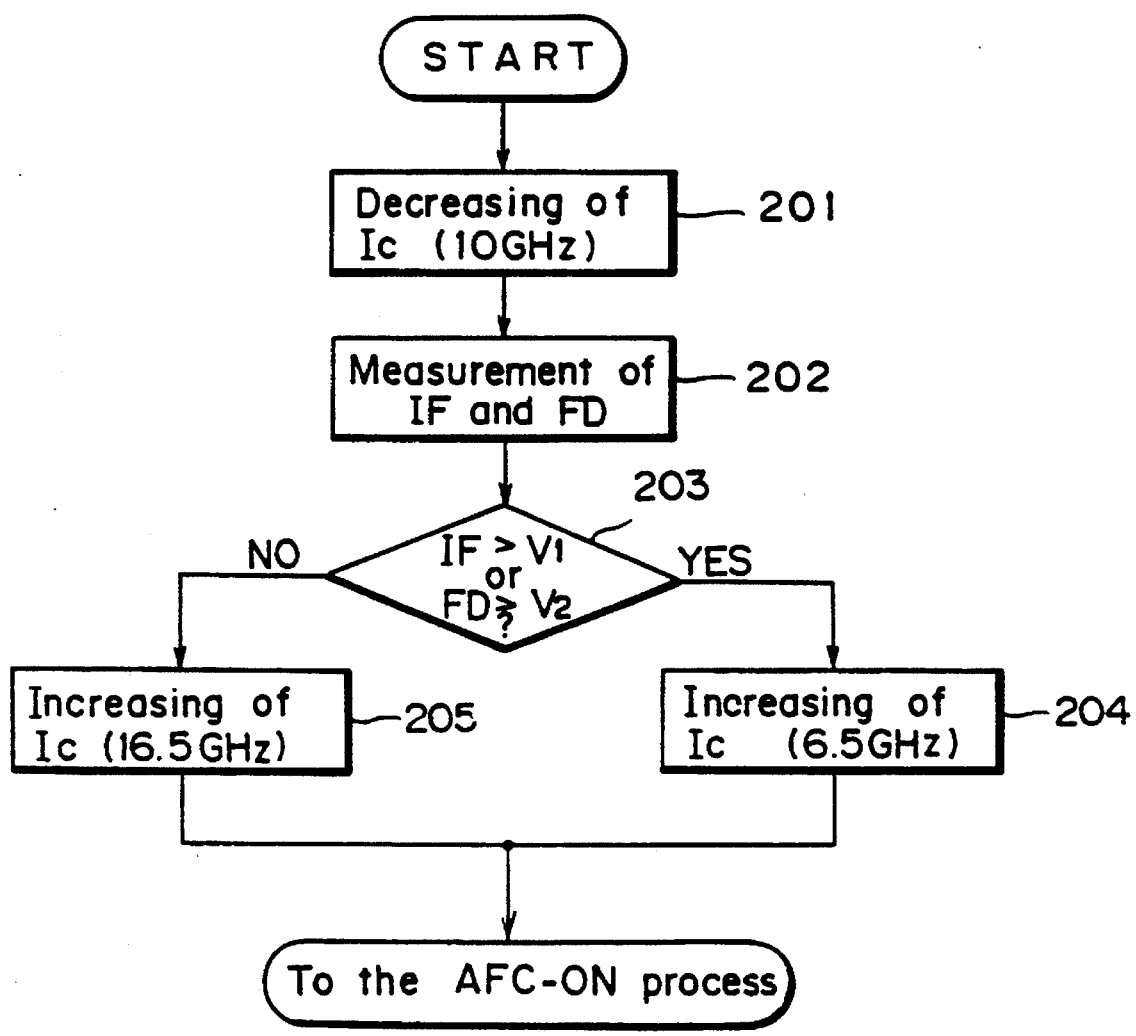
FIG. 10 is a flow chart showing an example of the routine for discriminating between real/image states and making related correction in the first embodiment of the present invention.

FIG. 10 is a flow chart showing an example of a routine for discriminating between real/image states and making relative correction when a frequency discriminator with the characteristic shown in FIG. 9 is used. This routine corresponds to the processes in the steps 111 and 112 of FIG. 5. When an IF signal is detected, this routine is started.

First in the step 201, the Ic bias is decreased by an amount corresponding to 10 GHz of the frequency of the local light (about one half of the frequency discriminating range). By so doing, the IF signal, when the IF signal is located at the right end of the second danger zone in FIG. 9, can be brought into the safety zone in the vicinity of 0 GHz. On the other hand, when the IF signal is located at the right end of the first danger zone, the IF signal is brought into its undetectable state. In any way, through the above process, the IF signal can be located within the range from −20 GHz to 0 GHz.

In the following step 202, the IF signal output and the frequency discriminator output are measured. The measurement of the IF signal output is performed by monitoring the IF signal four times for each of the P polarization and the S polarization and adding up the average values of the respective values. The measurement of the output of the frequency discriminator is performed by monitoring the output four times and obtaining the average value of the monitored values.

In the following step 203, it is decided whether or not at least either the IF signal output or the frequency discriminator output is larger than its reference threshold value stored in a data table. For this comparison, reference threshold values $V_1$ and $V_2$ are established for the IF signal output and the frequency discriminator output, respectively.

When either of the output levels is decided to be larger than the threshold value corresponding thereto in the step 203, it is judged that the IF signal is within the range from 0 GHz to 10 GHz at the start of this routine, and in the following step 204, the Ic bias is increased by the amount corresponding to 6.5 GHz, and then the flow moves to an AFC-ON process.

On the other hand, when both of the output levels are decided to be smaller than the threshold values corresponding thereto in the step 203, it is judged that the IF signal was within the range from −10 GHz to 0 GHz at the start of this routine, and in the following step 205, the Ic bias is increased by the amount corresponding to 16.5 GHz, and then the flow moves to the AFC-ON process.

By starting the AFC operation after taking the above steps, the frequency of the IF signal can be stabilized at 5 GHz and satisfactory demodulation can be achieved.

Figure 11:
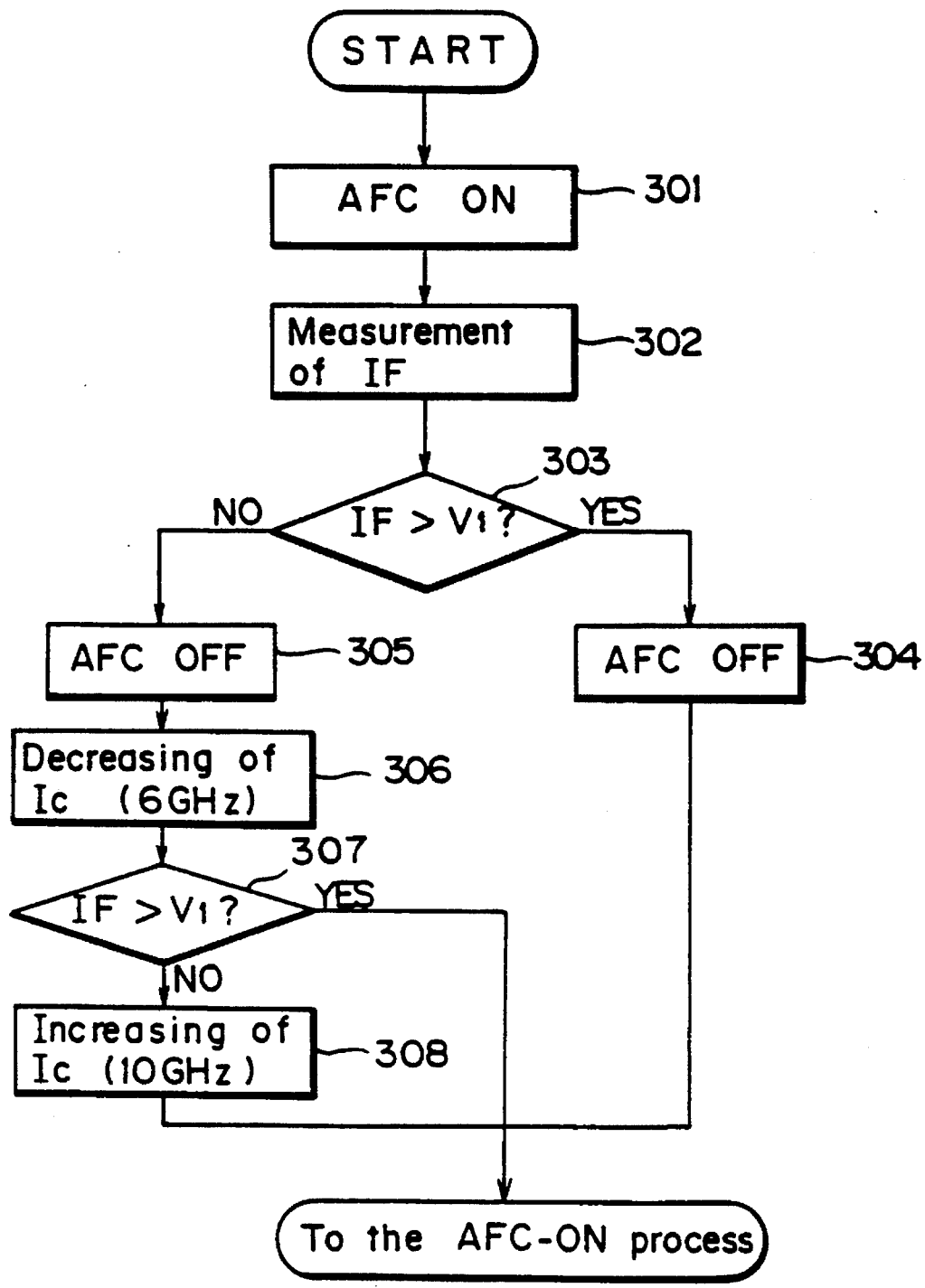
FIG. 11 is a flow chart showing another example of the routine for discriminating between real/image states and making related correction in the first embodiment of the present invention.

FIG. 11 is a flow chart showing another example of the routine discriminating between real/image states and making relative corrections in the first embodiment. This routine corresponds to the processes in the steps 111 and 112 in FIG. 5. In this example, it is adapted such that the AFC circuit is operated for a while and, according to the state of the IF signal then detected, it is decided whether the IF signal was in the safety region or in the danger zone. A concrete description will be given below.

First, in the step 301, the AFC circuit is switched on. Then, in the step 302, the IF signal output is measured, and in the step 303, it is decided whether or not the measured IF signal output is larger than the threshold value $V_1$ stored in the data table. When the measured value of the IF signal output is decided to be larger than the threshold value, it is judged that the IF signal was in the safety region (the capture range in FIG. 9). Then, in the step 304, the AFC circuit is temporarily switched off, and thereafter, the flow moves to the AFC-ON process.

When the IF signal output is decided to be smaller than the threshold value in the step 303, it is judged that the IF signal was in either the first or the second danger zone and the following processes are performed.

In the step 305, the AFC circuit is temporarily switched off and, in the following step 306, the Ic bias is decreased by the amount corresponding to 6 GHz. In the following step 307, it is decided whether or not the IF signal output is larger than the threshold value $V_1$ stored in the data table. When the IF signal output is decided to be larger than the threshold value in the step 307, it is judged that the IF signal was in the second danger zone at the start of this routine. Since the Ic bias has already been decreased by the amount corresponding to 6 GHz, the IF signal is now within the capture range, and therefore the AFC-ON process is executed with the Ic bias in this state.

When the IF signal output is decided to be smaller than the threshold value in the step 307, it is judged that the IF signal was in the first danger zone at the start of this routine. Then, in the step 308, the Ic bias is increased by the amount corresponding to 10 GHz and thereafter the flow moves to the AFC-ON process.

A description of the cold start control according to a practical example will be given below. In this example, the discrimination between the real/image states and relative correction are not performed in a separate routine but adapted such that the processes for discrimination between the real/image states and relative correction and the process for turning on the AFC circuit are performed in a single routine.

Figure 12A:
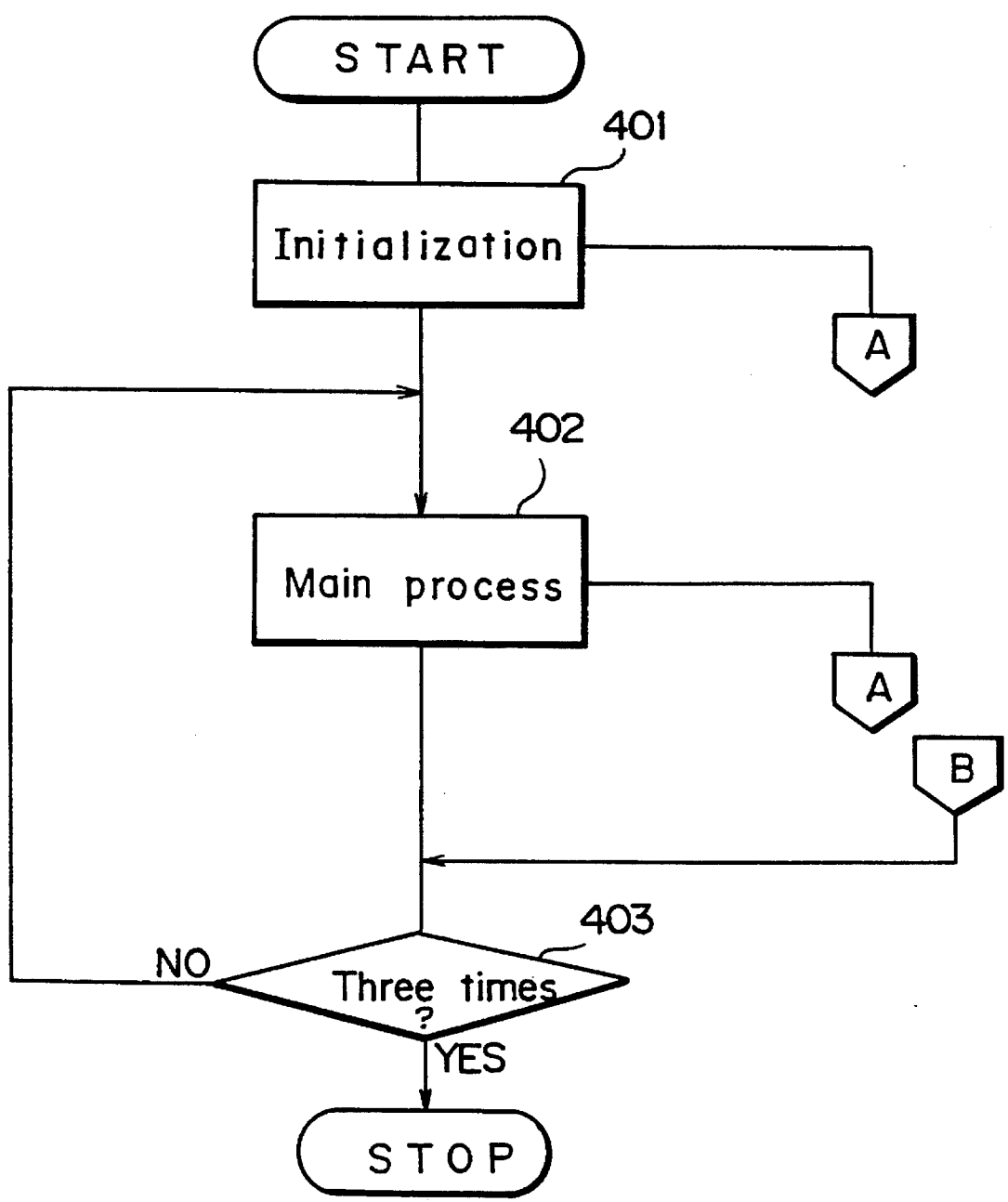
FIG. 12A and FIG. 12B are the first half and the second half, respectively, of a flow chart showing the outline of the cold start control in a second embodiment of the present invention.
Figure 12B:
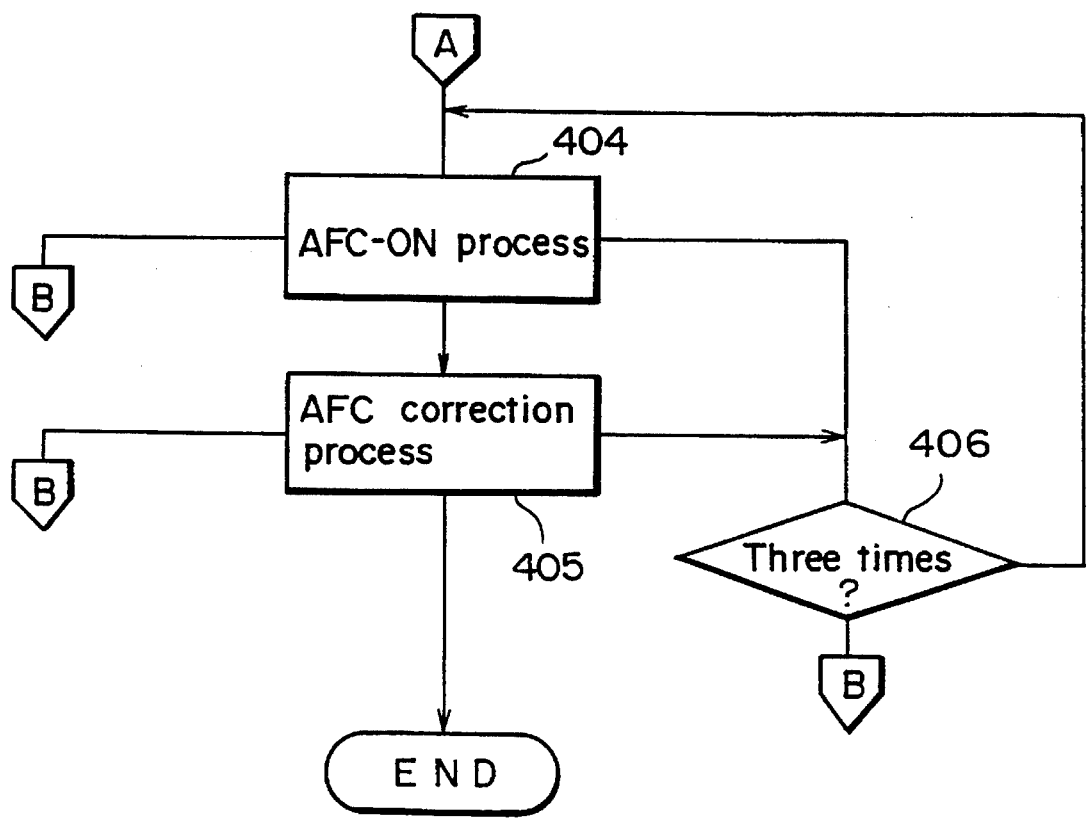

FIG. 12A and FIG. 12B are the first half and the second half, respectively, of a flow chart showing the outline of the cold start control in a second embodiment of the present invention. First, in the step 401, initialization for starting the cold start is performed. In the following step 402, which is for a main process, the Ic bias and the temperature of the local LD are changed to perform the sweep of the local light. The main process is repeated until it is decided in step 403 that the number of main process has been repeated three times. When the IF signal output or the frequency discriminator output is detected as the result of the initialization in the step 401 or the main process in the step 402, the flow moves to the AFC-ON process in the step 404, in which the AFC circuit is operated and it is decided whether or not a steady state is attained. Then, in the step 405, which is for an AFC correction process, the temperature of the local LD is adjusted and the Ic bias is corrected to an optimum value. The AFC-ON process in the step 404 and the AFC correction process in the step 405 are repeated until a normal state is attained. The number of repetitions is checked in the step 406 and, when the number of repetitions reaches three, the flow returns to the routine of the main process in the step 402. Also when the IF signal output and the frequency discriminator output become uncapturable, the flow returns to the routine for the main process in the step 402.

A detailed description of the cold start control will be given below.

Figure 13A:
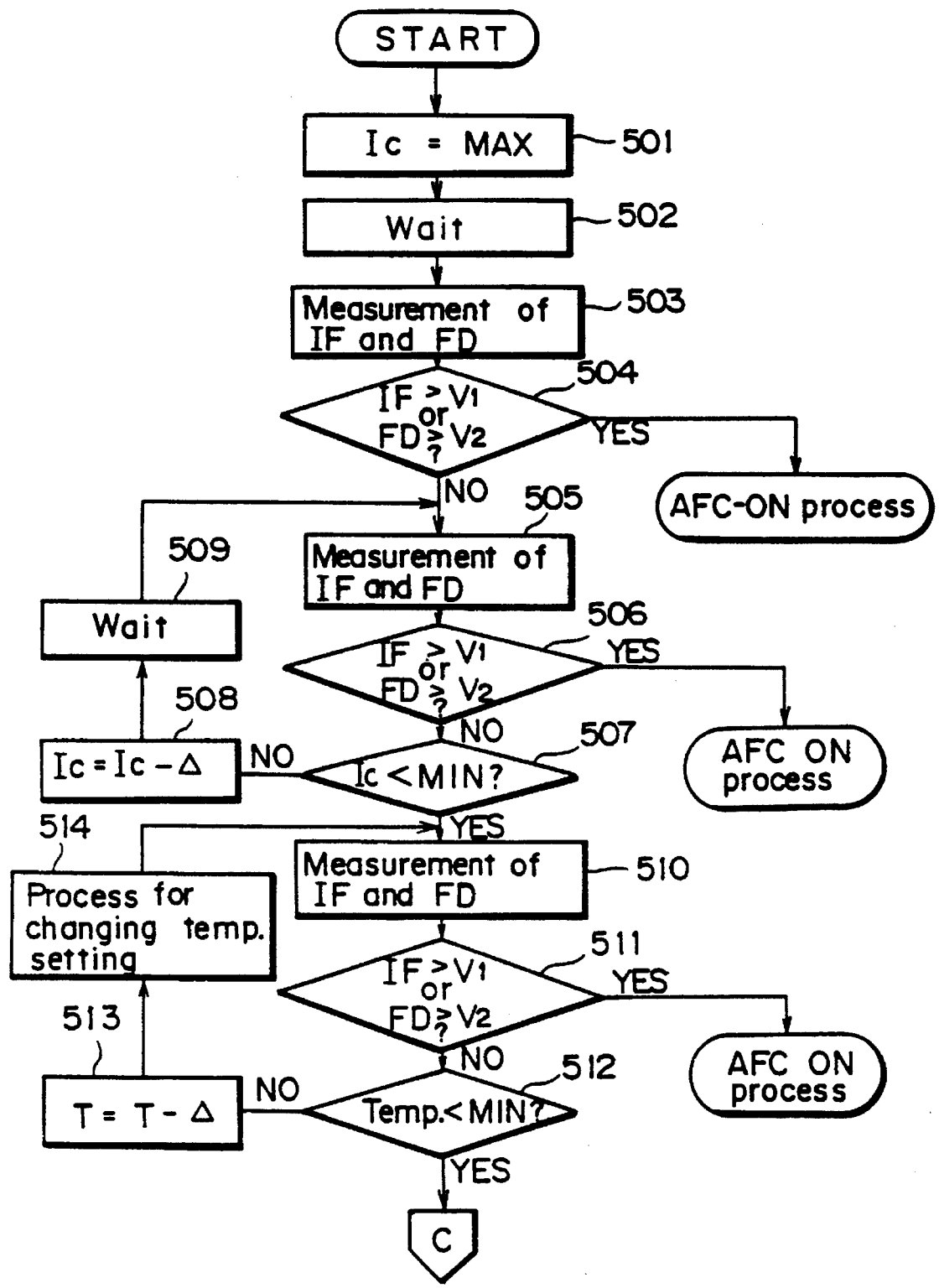
FIG. 13A and FIG. 13B are the first half and the second half, respectively, of a flow chart for the main process in FIG. 12A.
Figure 13B:
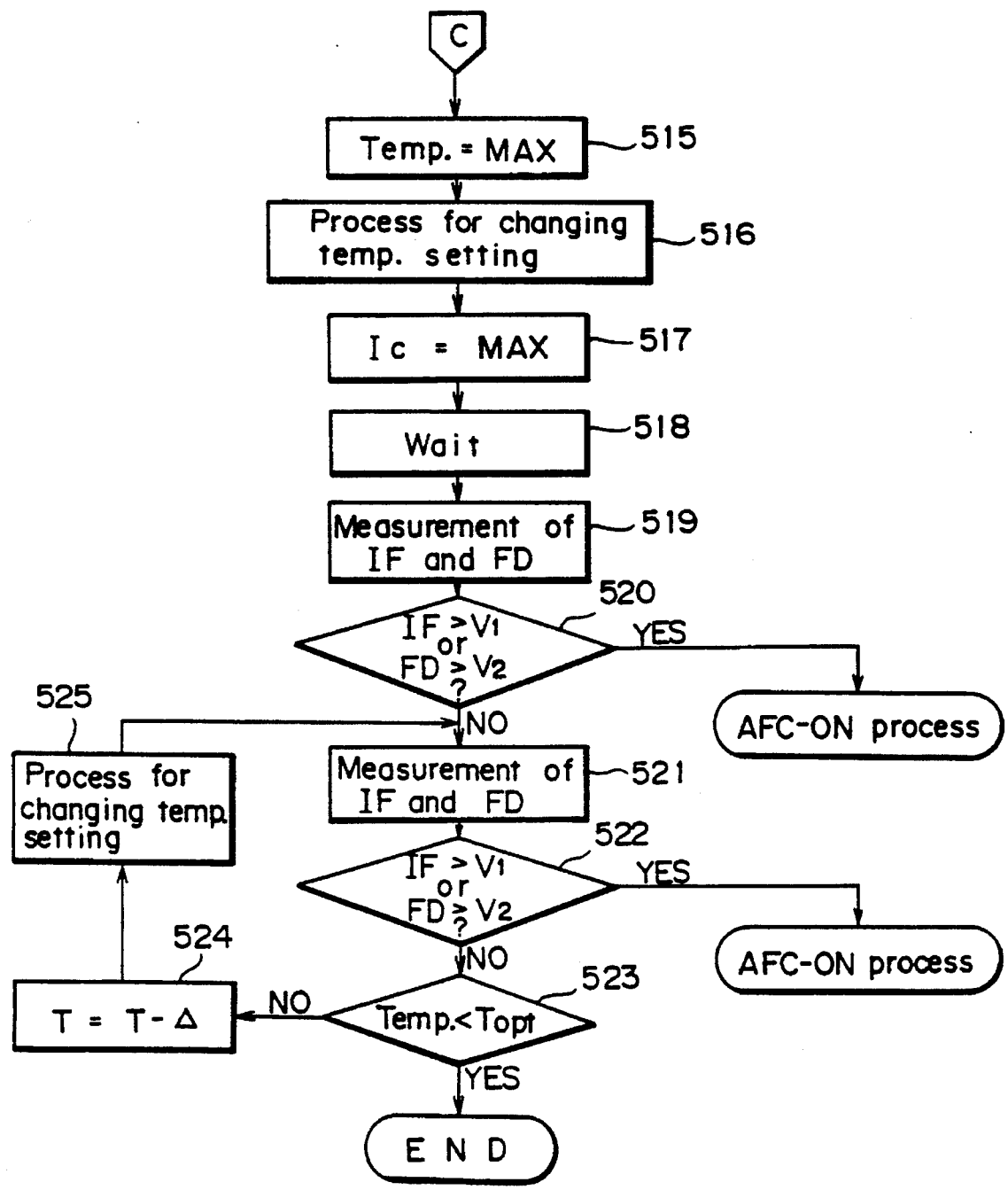

FIG. 13A and FIG. 13B are the first half and the second half, respectively, of a flow chart for the main process. In the main process, the Ic bias and the temperature of the local LD are swept over predetermined ranges and the levels of the IF signal output and the frequency discriminator output are checked. To be concrete, the Ic bias and the temperature of the local LD are varied in the following sequence.

① The temperature of the local LD is set to the optimum value (the center value of the variable range) and the Ic bias is varied from the upper limit to the lower limit of the variable range.

② While the Ic bias is set to the lower limit, the temperature of the local LD is varied from the optimum value to the lower limit.

③ While the Ic bias is set to the upper limit, the temperature of the local LD is varied from the upper limit to the optimum value.

The reason why the Ic bias is first adjusted is because the time required until a steady state is reached when the Ic bias is varied is much shorter than the time required until a steady state is reached when the temperature setting is varied, and also because there is a great possibility that the cold start is completed only by the adjustment of the Ic bias. The local light is swept in the above sequence because the whole adjustable range of the frequency of the local light can thereby be covered. A more concrete description of the main process will be given below.

In the step 501, the Ic bias is set to the upper limit and, in the step 502, the main process waits a sufficient time for a steady state to be reached (for example, 0.1 sec.). In the following step 503, the IF signal output and the frequency discriminator output are measured. In the step 504, the same as in the step 203 in FIG. 10, it is decided whether or not either the IF signal output or the frequency discriminator output is larger than the threshold value $V_1$ or $V_2$, respectively corresponding thereto. When either of the output levels is larger than the threshold value corresponding thereto, the flow moves to the AFC-ON process, and when both of the output levels are smaller than the threshold values corresponding thereto, the flow advances to the step 505. In the step 505, the IF signal output and the frequency discriminator output are measured and, in the following step 506, it is decided whether or not either of the output levels is larger than the threshold value corresponding thereto. When either of the output levels is decided to be larger than the threshold value corresponding thereto, the flow moves to the AFC-ON process, and when both of the output levels are decided to be smaller, the flow advances to the step 507, in which case it is decided whether or not the Ic bias is smaller than the lower limit. If the Ic bias is not smaller than the lower limit, then, in the step 508, the Ic bias is decreased by the amount corresponding to 6 GHz. In the following step 509, a predetermined time is waited and then the flow returns to the step 505. If the Ic bias is decided to be lower than the lower limit in the step 507, the flow advances to the step 510 and therein the IF signal output and the frequency discriminator output are measured. In the following step 511, it is decided whether or not either of the output levels is larger than the threshold value corresponding thereto, and when either is decided to be larger, the flow moves to the AFC-ON process. When both of the output levels are decided to be smaller than the threshold values corresponding thereto in the step 511, the flow advances to the step 512, in which it is decided whether or not the temperature of the local LD is below the lower limit. When the temperature of the local LD is not below the lower limit, the flow moves to the step 513, in which case the temperature of the local LD is decreased by the amount corresponding to 6 GHz. Then, in the step 514, the temperature of the local LD is stabilized through a process for changing temperature setting, and then the flow returns to the step 510.

When, in the step 512, the temperature of the local LD is decided to be lower than the lower limit, the flow advances to the step 515, in which case the temperature of the local LD is set to the upper limit. Then, in the step 516, the temperature of the local LD is stabilized through a process for changing temperature setting, and then the flow advances to the step 517, in which case the Ic bias is set to the upper limit. Then, in the step 518, a predetermined time is waited, and in the following step 519, the IF signal output and the frequency discriminator output are measured. Then, in the step 520, it is decided whether or not either of the output levels is larger than the threshold value corresponding thereto. When either is larger, the flow moves to the AFC-ON process, and when both of the output levels are smaller than the threshold values corresponding thereto, the flow advances to the step 521. In the step 521, the IF signal output and the frequency discriminator output are measured and, in the following step 522, it is decided whether or not either of the output levels is larger than the threshold value corresponding thereto. When either output level is larger than the corresponding threshold value, the flow moves to the AFC-ON process, and when both of the output levels are smaller than the threshold values corresponding thereto, the flow moves to the step 523. In the step 523, it is decided whether or not the temperature of the local LD is below the optimum value, and when the temperature is not below the optimum value, the flow moves to the step 524. In the step 524, the temperature of the local LD is decreased by the amount corresponding to 6 GHz. In the following step 525, the temperature of the local LD is stabilized through a process for changing temperature setting. Thereafter, the flow returns to the step 521. When, in the step 523, the temperature of the local LD is below the optimum value, the main process (refer to the step 402 in FIG. 12A) is ended.

Below the details of the AFC-ON process will be described. The object of this process is to turn on the AFC circuit to check whether or not the IF signal output and the frequency discriminator output are at normal values, and to correct them when they are not normal.

Figure 14A:
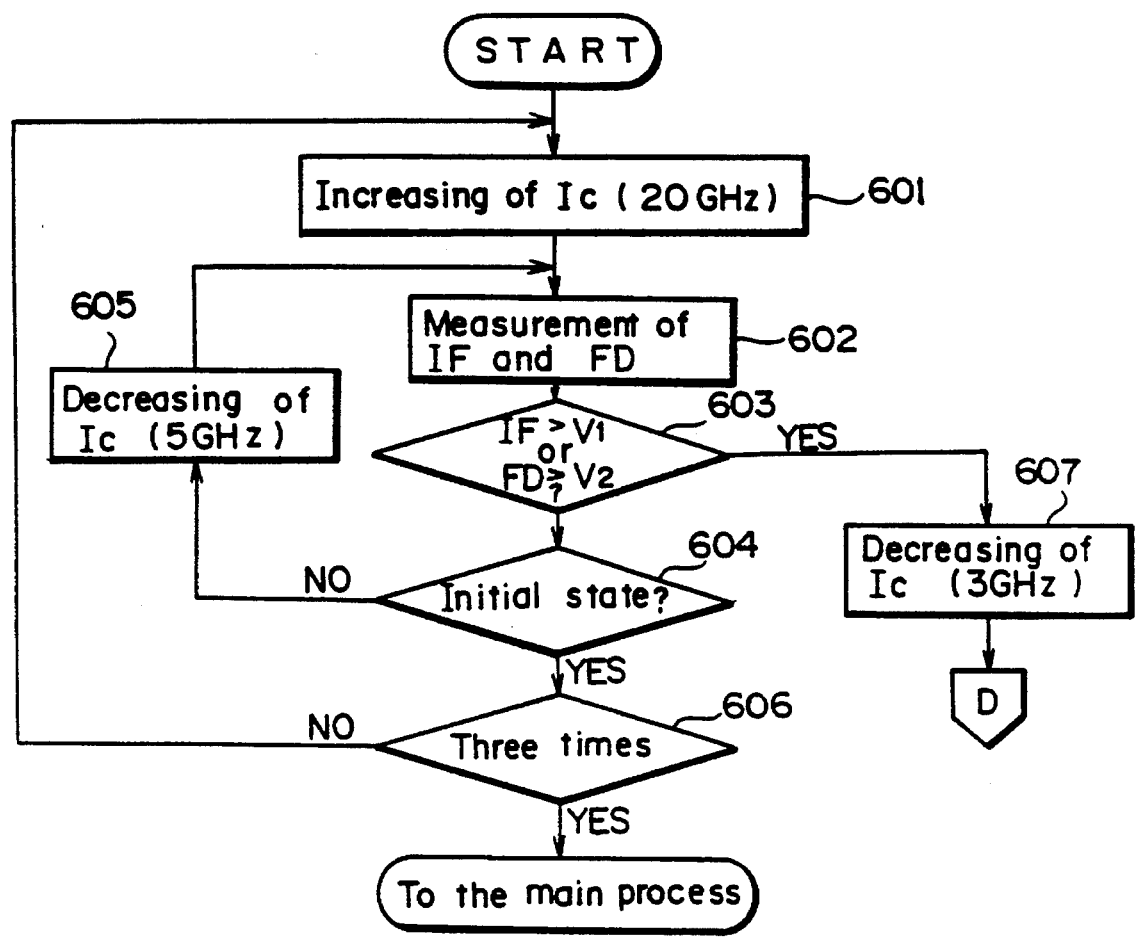
FIG. 14A, FIG. 14B, and FIG. 14C are the first, middle, and last portions, respectively, of a flow chart for an AFC-ON process in FIG. 12B.
Figure 14B:
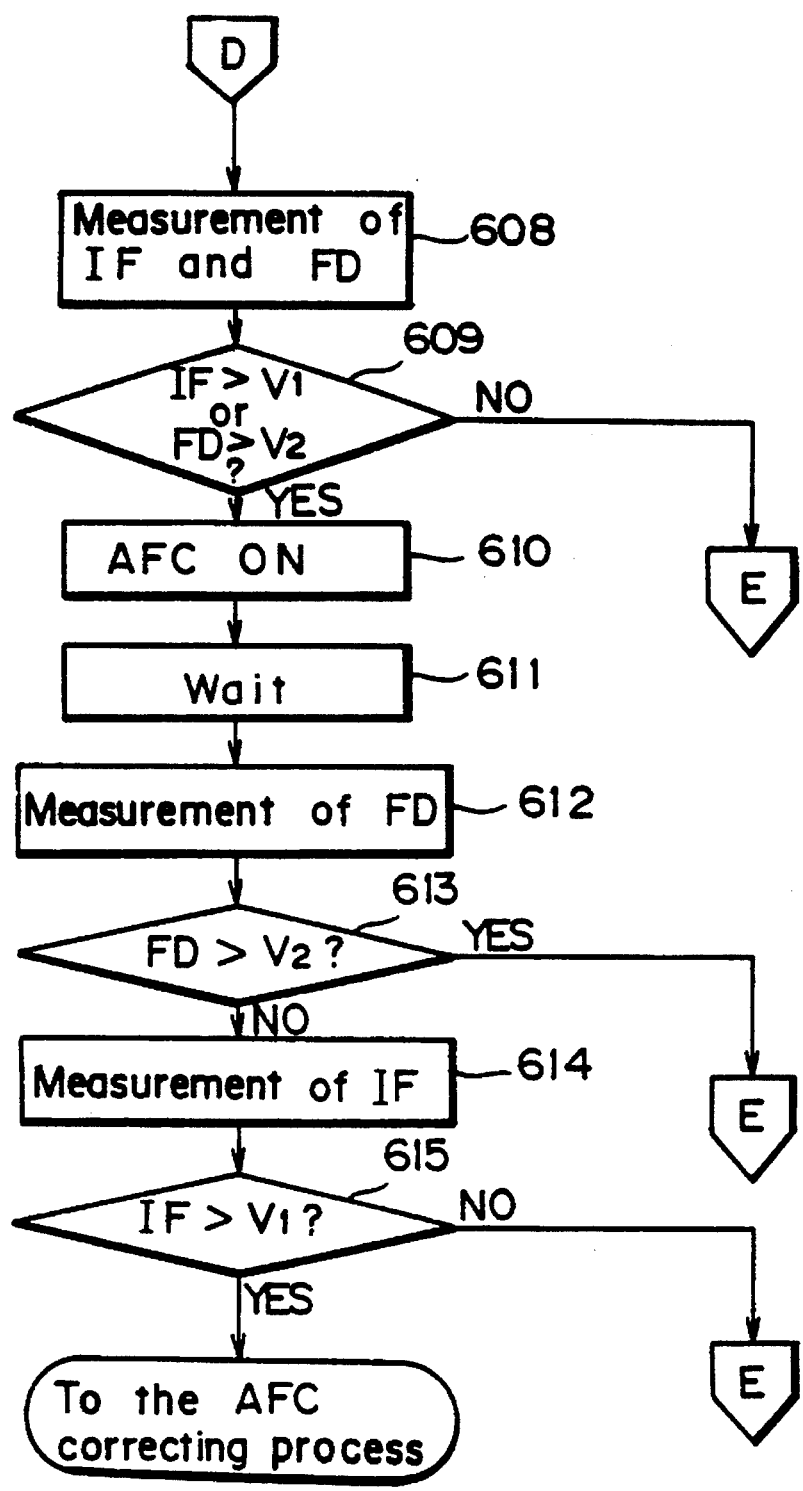
Figure 14C:
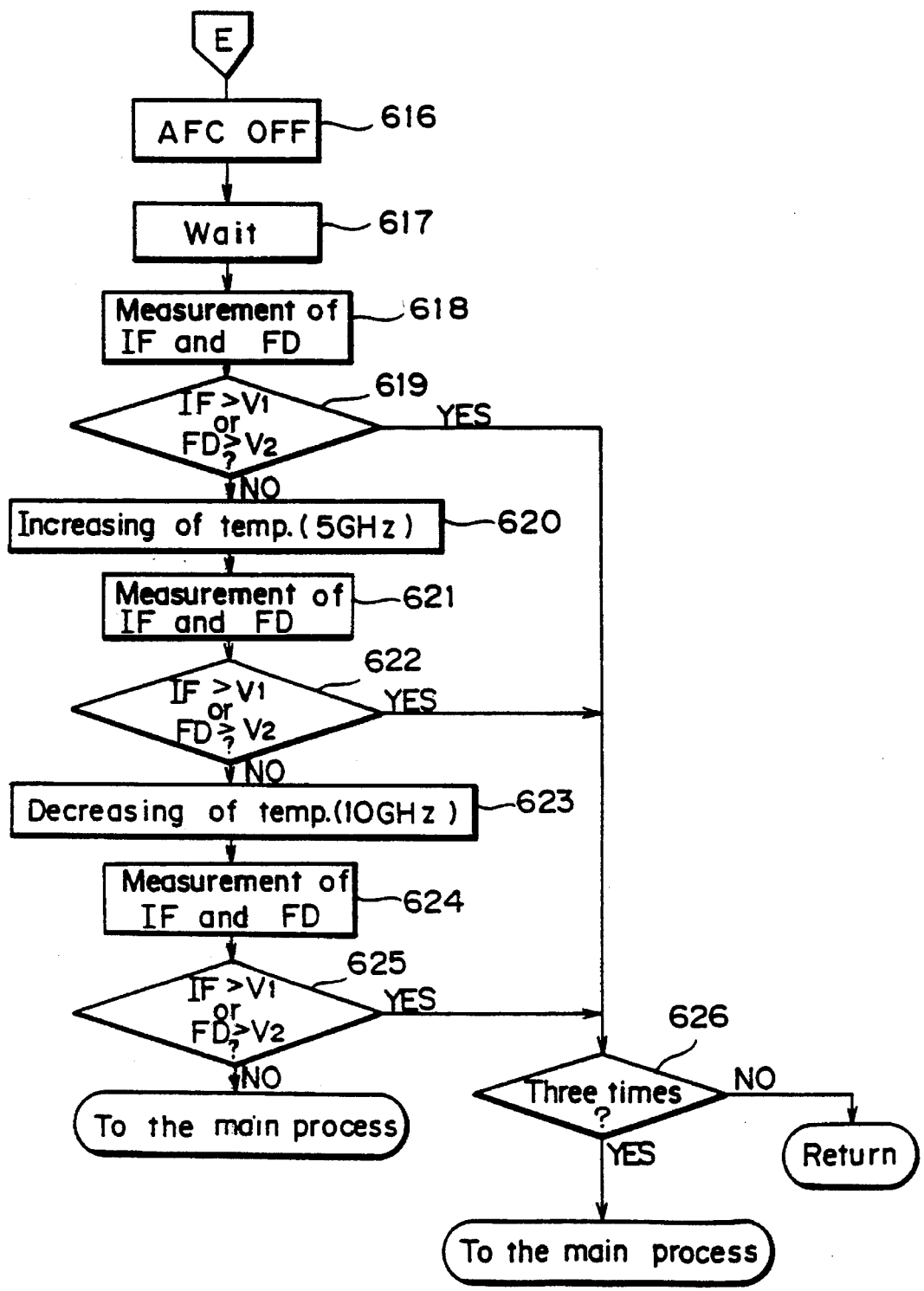

FIG. 14A, FIG. 14B, and FIG. 14C are the first, middle, and last portions, respectively, of a flow chart of the AFC-ON process. First, in the step 601, the Ic bias is increased by the amount corresponding to 20 GHz of the local light frequency. Then, in the step 602, the IF signal output and the frequency discriminator output are measured. In the following step 603, it is decided whether or not either of the output levels is larger than the threshold value $V_1$ or $V_2$ corresponding thereto. When either of the output levels is decided to be larger than the threshold value corresponding thereto, the flow moves to the step 607, in which the Ic bias is decreased by the amount corresponding to 3 GHz, and then advances to the step 608. When, in the step 603, it is decided that both of the output levels are smaller than the threshold values corresponding thereto, the Ic bias is decreased in the step 605, unless it is decided in the step 604 that the Ic bias has been decreased by the amount corresponding to 20 GHz, by the amount corresponding to 5 GHz every time, and thereafter the steps 602 and 603 are repeated. When it is decided in the step 604 that the Ic bias has been decreased by the amount corresponding to 20 GHz, namely, it is decided that the Ic bias has reached the value corresponding to the initial state of the present AFC-ON process, the flow advances to the step 606, in which it is decided whether or not the current AFC-ON process has been performed for the third time. When the current AFC-ON process has not been performed for the third time, the steps 601, 602, 603, 604, and 605 are repeated, and when the current AFC-ON process has been performed for the third time, the flow returns to the main process.

In the step 608, the IF signal output and the frequency discriminator output are measured and, in the following step 609, it is decided whether or not either of the outputs is larger than the threshold value $V_1$ or $V_2$ corresponding thereto. When both of the output levels are decided to be smaller than the threshold values corresponding thereto, the flow moves to the step 616, and when either of the output levels is decided to be larger than the threshold value corresponding thereto, the flow advances to the step 610, in which case the AFC circuit is switched on. In the following step 611, a predetermined waiting time (for example, 0.1 sec.) is waited and then, in the step 612, the output of the frequency discriminator is measured. In the next step 613, it is decided whether or not the output of the frequency discriminator is larger than the threshold value $V_2$. If the output of the frequency discriminator is larger than the threshold value though the AFC operation is performed, it is apparent that a normal operation is not performed and, hence, the flow moves to the step 616, in which the AFC circuit is switched off. When, in the step 613, the output of the frequency discriminator is decided to be smaller than the threshold value, the flow advances to the step 614, in which case the IF signal output is measured. Then, in the following step 615, it is decided whether or not the IF signal output is larger than the threshold value $V_1$. When it is larger, the AFC-ON process is ended and the flow moves to the AFC correction process. When, in the step 615, the IF signal output is decided to be smaller than the threshold value, the flow moves to the step 616.

After the AFC circuit has been switched off in the step 616, a predetermined waiting time (for example, 0.1 sec.) is waited in the step 617. Then, in step 618, the IF signal output and the frequency discriminator output are measured. Then, in the step 619, it is decided whether or not either of the outputs is larger than the threshold value corresponding thereto, and when it is larger, the flow moves to the step 626. When both of the output levels are decided to be smaller than the threshold values corresponding thereto, the flow advances to the step 620, in which case the temperature of the local LD is increased by the amount corresponding to 5 GHz. Then, in the step 621, the IF signal output and the frequency discriminator output are measured. In the following step 622, it is decided whether or not either of the output levels is larger than the threshold value corresponding thereto, and when it is larger, the flow moves to the step 626. When, in the step 622, both of the output levels are decided to be smaller than the threshold values corresponding thereto, the flow advances to the step 623, in which the temperature of the local LD is decreased corresponding to 10 GHz. Then, in the step 624, the IF signal output and the frequency discriminator output are measured. In the following step 625, it is decided whether or not either of the outputs is larger than the threshold value corresponding thereto, and when it is larger, the flow moves to the step 626. When both of the output levels are decided to be smaller than the threshold values corresponding thereto, the flow returns to the main process. In the step 626, it is checked whether or not the AFC-ON process has been repeated three times, and when it has been repeated three times, the flow returns to the main process. When it has not been repeated three times, the flow returns to the START of the AFC ON process.

Figure 15A:
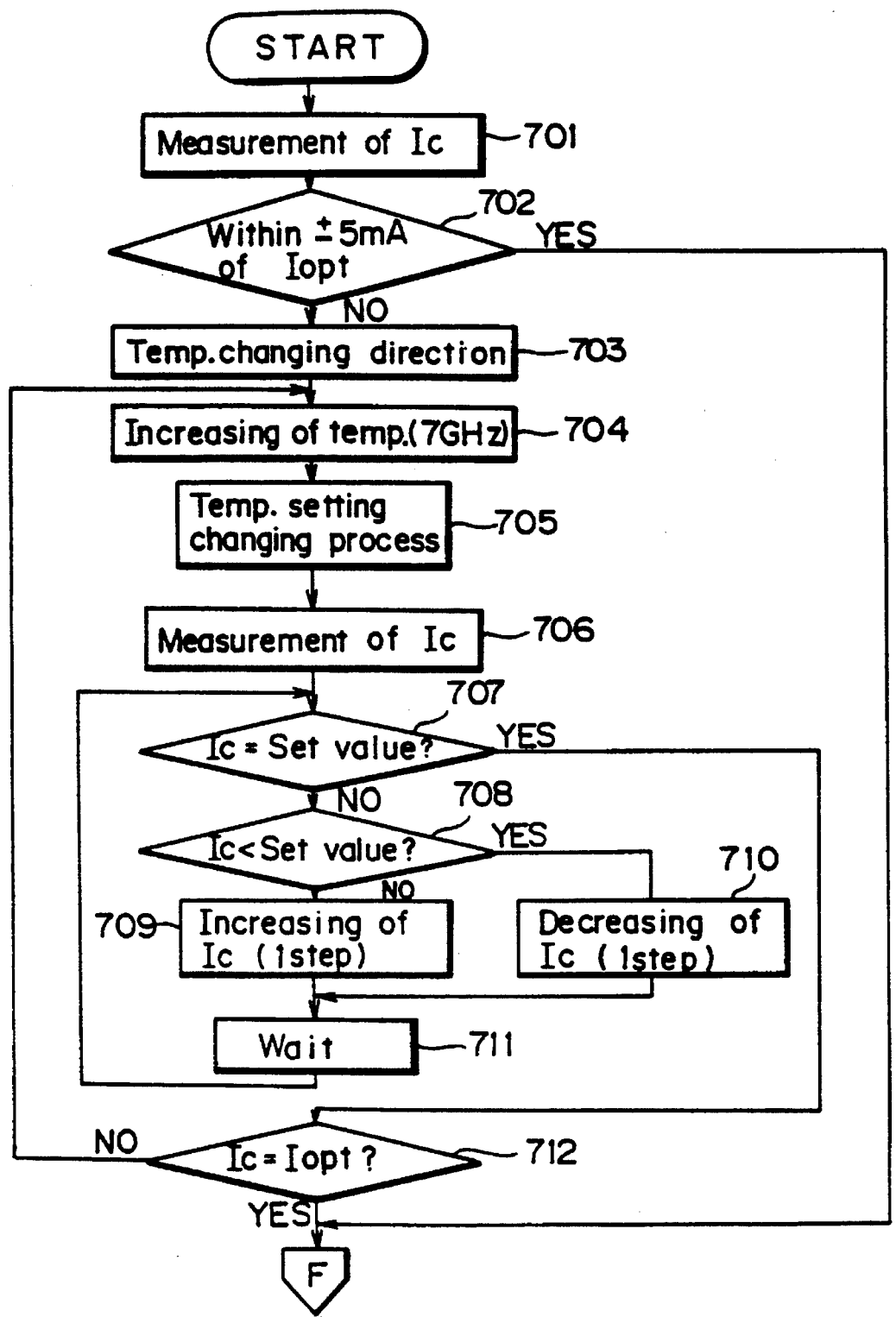
FIG. 15A and FIG. 15B are the first half and the second half, respectively, of a flow chart for the AFC correction process in FIG. 12B.
Figure 15B:
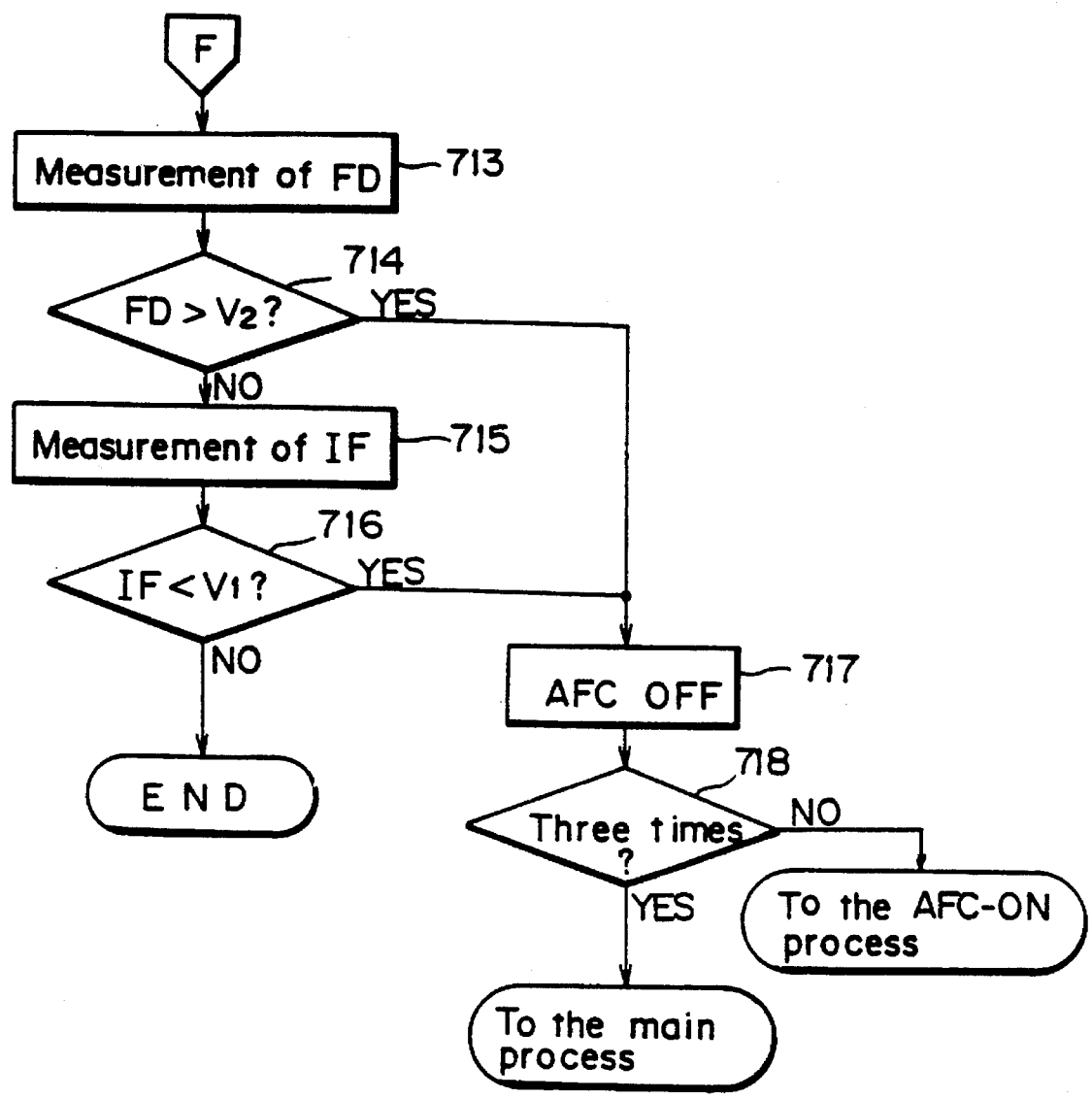

FIG. 15A and FIG. 15B show a flow chart for the AFC correction process. The AFC correction process is for adjusting the temperature of the local LD and setting the Ic bias to the optimum value. In other words, it is for re-establishing the Ic bias and the temperature of the local LD such that the Ic bias takes on virtually the center value of its variable range after the cold start, and thereby the tracking range is widened. A concrete description will be given below.

First, in the step 701, the Ic bias is measured and, in the following step 702, it is decided whether or not the measured value is within the range of ±5 mA of the optimum value. The measurement of the Ic bias is achieved by monitoring the Ic bias four times and obtaining the average value (b) of the monitored values. When the measured value of the Ic bias is within the range of ±5 mA of the optimum value, the flow moves to the step 713 and, when it is not within that range, the flow advances to the step 703, in which the temperature changing direction is decided. In this step, first f=b–(optimum Ic bias value) is calculated. When f is a positive values the temperature of the local LD is increased by the amount corresponding to 7 GHz in the step 704. When f is a negative value, the temperature of the local LD is decreased by the amount corresponding to 7 GHz in the step 704. Then, in the step 705, a temperature setting changing process is performed so that the temperature of the local LD is stabilized. Thereafter, in the step 706, the Ic bias is monitored. In the following steps 707 to 711, the Ic bias is varied one step at a time until the Ic bias becomes equal to its set value. In the step 707, it is decided whether or not the monitored value of the Ic bias is equal to the set value, and when they are equal, the flow moves to the step 712, and when they are not equal, the flow advances to the step 708. In the step 708, it is decided whether or not the monitored value is smaller than the set value, and when it is smaller, the flow moves to the step 710, in which case the Ic bias is decreased one step. On the other hand, when the monitored value is decided to be larger than the set value, the flow advances to the step 409, in which case the Ic bias is increased one step. Then, in the following step 711, a predetermined waiting time is waited and the flow returns to the step 707. In the step 712, it is decided whether or not the monitored value of the Ic bias is the optimum value, and when it is not the optimum value, the flow returns to the step 704, and when it reaches the optimum value, the flow advances to the step 713.

In the step 713, the output of the frequency discriminator is measured and, in the step 714, it is decided whether or not the output is larger than the threshold value $V_2$. When the output of the frequency discriminator is smaller than the threshold value, it is judged that the AFC circuit is normally operating and, in the following step 715, the IF signal output is monitored for confirmation, and in the step 716, it is decided whether or not the monitored output level is larger than the threshold value $V_1$. When the IF signal output is decided to be larger than the threshold value in the step 716, the cold start is ended. When the output of the frequency discriminator is decided to be larger than the threshold value in the step 714, or when the IF signal output is decided to be smaller than the threshold value in the step 716, the flow moves to the step 717, in which case the AFC circuit is switched off. In the following step 718, it is decided whether or not the AFC-ON process is performed for the third time, and if it is not yet that for the third time, the AFC-ON process is performed once again from the beginning, and if it is performed for the third time, the flow returns to the main process.

Figure 16:
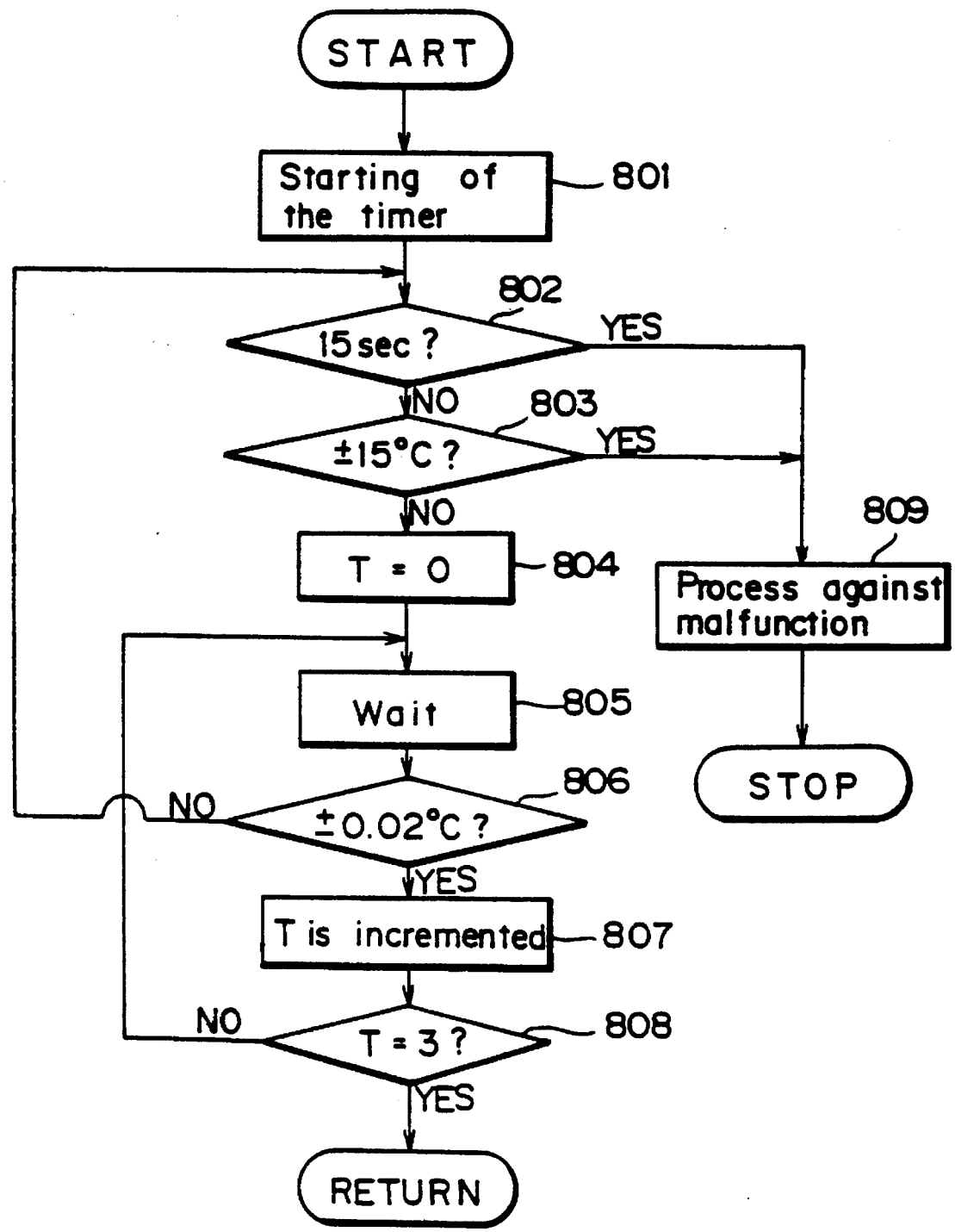
FIG. 16 is a flow chart for a temperature setting changing process.

FIG. 16 is a flow chart for a temperature setting changing process. When the temperature setting of the local LD is changed, it requires a certain time until the temperature is stabilized, and hence such a subroutine as this is provided to confirm that the temperature has been stabilized, In this case, a thermal runaway is also detected. In the event of a thermal runaway, it is adapted such that the system escapes from the cold start controlling routine and comes into an abnormal operation mode. A concrete description will be given below.

First, in the step 801, a timer is started, and in the following step 802, it is decided whether or not the time required for execution of this routine has exceeded 15 sec. When the temperature does not become stabilized, even if this routine has been continuously executed over 15 sec., there is a high possibility that a thermal runout has occurred. Therefore, the flow moves to the step 809, in which a process against malfunction is performed and the cold start is stopped. When the required time is decided to be below 15 sec. in the step 802, the flow moves to the step 803, in which the deviation between the measured value of the temperature of the local LD and the set value (temperature deviation) is obtained and it is decided whether or not the temperature deviation is outside the range of ±15° C. When the temperature deviation is decided to be outside the range of ±15° C., the flow moves to the step 809, in which case the process against malfunction is performed and the cold start is stopped. When the temperature deviation is decided to be within ±15° C., the flow advances to the step 804, in which case a parameter T is cleared to 0. In the following step 805, a predetermined waiting time is waited, and then the flow advances to the step 806. In the step 806, it is decided whether or not the temperature deviation is within ±0.02° C., and when it is within ±0.02° C., the flow advances to the step 807, in which case the parameter T is incremented. Then in the step 808, it is checked whether or not the parameter T is 3. When the parameter T is 3, the system escapes from this routine. When the parameter T is not yet 3 in the step 808, the flow returns to the step 805. Namely, the steps 805, 806, and 807 are repeated up to three times. When, in the step 806, the temperature deviation is decided to be outside the range of ±0.02° C., the flow returns to the step 802. By performing this temperature setting changing process every time the temperature of the local LD is changed, a thermal runout due to incomplete temperature control or the like can be prevented from occurring.

Figure 17:
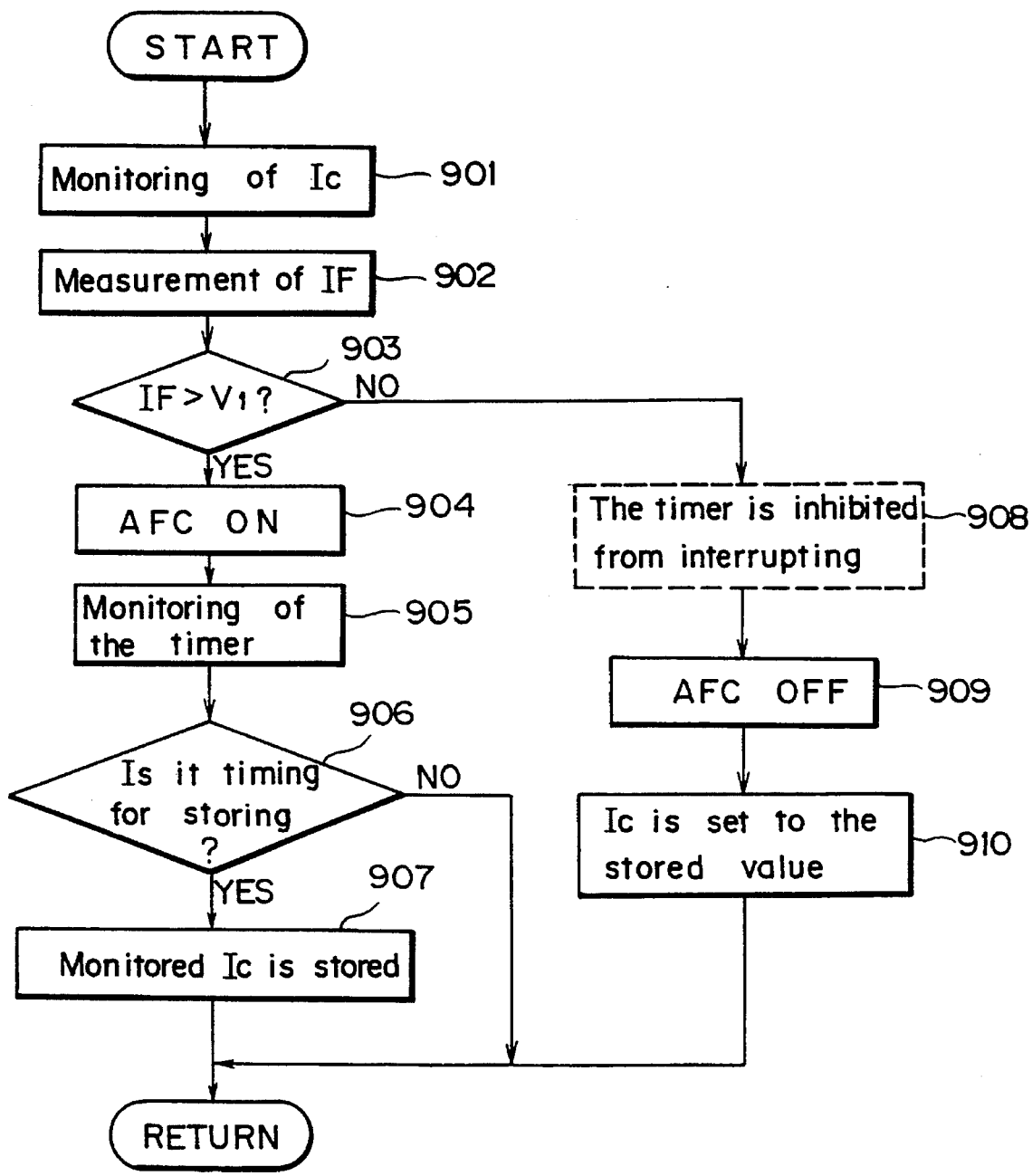
FIG. 17 is a flow chart for an AFC hold process.

FIG. 17 is a flow chart for an AFC hold process. This process is performed while an AFC operation is being performed after the cold start has been made normally. When the AFC circuit is switched on, the Ic bias is feedback controlled such that the difference between the frequency of the signal light and the frequency of the local light is maintained at 5 GHz. When the light input to the heterodyne receiver is blocked while the AFC circuit is held switched on, both the S polarization component and the P polarization component of the IF signal output disappear. Then, the feedback control signal will go past the upper control limit or lower control limit and, thereby, a malfunction of the AFC operation will be produced. In such case, by performing the cold start again, it is possible to capture again the IF signal. However, it is presumed that a long time is required for doing so, and further, it is supposed that the input light is frequently blocked. The purpose of the AFC hold process is to automatically detect the blocked input light to thereby automatically control the switching on/off operation of the AFC circuit and, in the meantime, to hold the Ic bias constant, irrespective of the on/off states of the AFC circuit, so that the IF signal is held at a predetermined frequency position and, therefore, operations of the apparatus by the persons for maintenance and testing are simplified.

To be concrete, even when the AFC circuit is switched off, operations are performed for correcting the Ic bias set value so that the IF signal always appears at its predetermined frequency position. Since (Ic bias monitored value) =(Ic bias set value)+ (fed back current value by electronic circuit), by setting the value of the Ic bias monitored immediately before the light input was blocked, i.e., when the AFC circuit was in its switched-on state, as the set value of the Ic bias, the IF signal can be arranged at all times to appear at a predetermined frequency position. Further, as the information immediately before the light input is blocked, the value of the Ic bias monitored one sec. before is adapted to be held continuously renewed as long as the AFC circuit remains switched on. The time one sec. is set up, assuming that the uncertain time span for a human being to connect or disconnect an optical connector is around 0.1 sec., as a time to be sufficiently longer than that.

In the step 901, the Ic bias is monitored and, in the following step 902, the IF signal output is measured. Then, in the Step 903, it is decided whether or not the measured value of the IF signal output is larger than the threshold value $V_1$, and when it is larger, the flow advances to the step 904, in which case the AFC circuit is switched on. Then, in the step 905, the timer is monitored, and in the following step 906, it is decided whether or not it is the timing for storing the current value of the Ic bias. When it is decided to be the timing for storing the current value, the flow advances to the step 907, in which the value of the Ic bias monitored in the step 901 is stored in a predetermined data table. If the IF signal output is decided to be smaller than the threshold value in the step 903, then in the step 908, the timer is inhibited from interrupting when necessary, and the flow advances to the step 909, in which the AFC circuit is switched off. Accordingly, the AFC circuit is continued to be switched off unless the IF signal is detected. Then, in the step 910, the value of the Ic bias monitored one sec. before and stored in the data table is read therefrom and this value is made the set value. Hence, while the IF signal is not detected, the set value of the Ic bias is held over.

Now, when the AFC circuit is switched on, the Ic bias is feedback controlled and an IF signal at a predetermined frequency can be obtained. However, since the controllable range of the Ic bias is approximately ±20 mA, if the center frequency of the signal light is deviated in the same direction due to aged deterioration of the light source or the like, there is a possibility that the AFC circuit becomes unable to follow it up. Therefore, it is arranged such that the change in the Ic bias is monitored and, when the change comes on the point of exceeding a certain value, the Ic control current of the AFC circuit is brought back to the vicinity of the center value by changing the temperature. For example, when the Ic bias has reached the upper limit (corresponding to the state where the local LD has been brought to the limit on the shorter wavelength side), the Ic bias can be brought back to the vicinity of the center of its variable range by changing the temperature to bring the local light to the side of shorter wavelength. Such operations can be performed with the AFC circuit switched on. By changing the temperature only 0.5° C. or so, the AFC circuit becomes able to satisfactorily follow up the signal light. A concrete description will be given below.

Figure 18A:
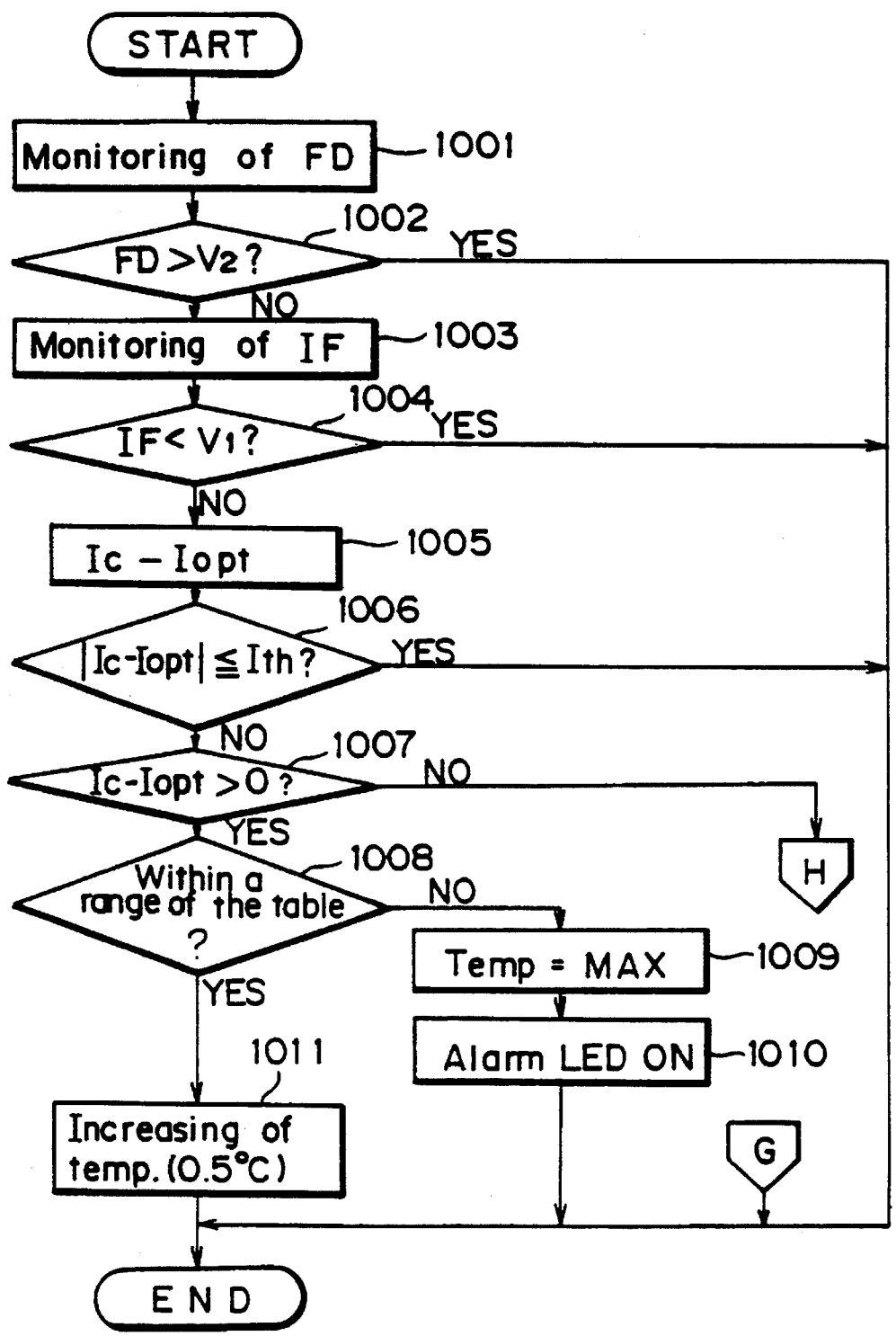
FIG. 18A and FIG. 18B are the first half and the second half, respectively, of a flow chart for an AFC setting changing process.
Figure 18B:
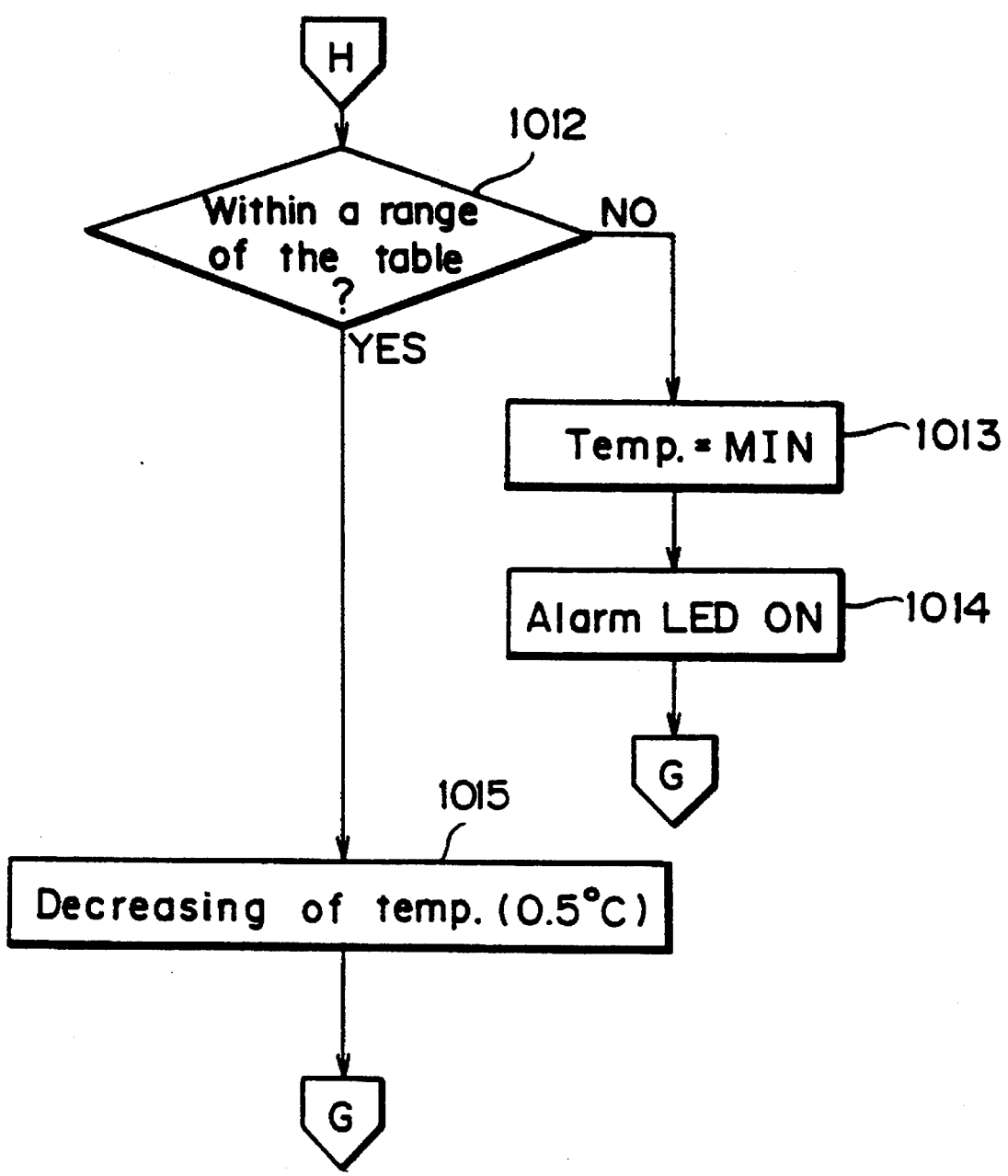

FIG. 18A and FIG. 18B show a flow chart for the AFC setting changing process. First, in the step 1001, the output of the frequency discriminator is monitored and, in the following step 1002, it is decided whether or not the monitored value is larger than the threshold value $V_2$. When the monitored value is larger than the threshold value, this process is ended, but when it is smaller, the flow advances to the step 1003, in which the IF signal output is monitored. In the following step 1004, it is decided whether or not the IF signal output is smaller than the threshold value $V_1$ and, when it is smaller, this process is ended. When the IF signal output is decided to be larger than the threshold value in the step 1004, the flow advances to the step 1005, in which case the absolute value and sign of the difference between the monitored Ic bias and the optimum bias value Iopt are obtained. In the following step 1006, it is decided whether or not the absolute value is smaller than the AFC threshold value Ith stored in the data table. When the absolute value is smaller than the AFC threshold value, this process is ended, but when it is larger, the flow advances to step 1007, in which it is decided whether or not the sign of the difference is positive. When the sign of the difference is negative, the flow moves to the step 1012, but when the sign of the difference is positive, it advances to the step 1008.

In the step 1008, it is decided whether or not the temperature obtained by adding 0.5° C. to the temperature of the local LD at the present moment is within the range of a table of a range of effective control and, when it is within the range, the temperature of the local LD is increased by 0.5° C. in the step 1011 and this process is ended. When it is decided, in the step 1008, that the temperature is not within the range, the flow advances to the step 1009, in which the temperature of the local LD is set to its upper limit. Then, in the step 1010, an alarm LED is turned on and this process is ended. When, in the step 1007, the sign of the difference is decided to be negative, the flow moves to the step 1012, in which it is decided whether or not the temperature obtained by subtracting 0.5° C. from the temperature of the local LD at the present moment is within the range of the table of the range of effective control and, when it is within the range, the temperature of the local LD is decreased by 0.5° C. in the step 1015 and this process is ended. When it is decided, in the step 1012, that the temperature is not within the range, the temperature of the local LD is set to its lower limit at the step 1013. Then, in the step 1014, an alarm LED is turned on and this process is ended.

While the present invention has been described with reference to particular embodiments, the invention is not limited to the details of these embodiments. For example, it is adapted in the above embodiments such that the frequency of the local light is swept until the IF signal is detected. However, it may be practicable to execute supervisory control of the system including the optical transmitter and the like and to sweep the center frequency of the signal light or to sweep both the frequency of the signal light and the frequency of the local light.

Thus, preferred embodiments described herein are given by way of illustration only and are not limitative of the present invention. The scope of the invention is defined by the appended claims and all changes and modifications as fall within the equivalence of the scope of the claims are therefore to be embraced by the invention.

What is claimed is:

1. A cold start control system for use in a coherent lightwave communications system, comprising:

optical detection means for mixing signal light and local light to output an intermediate-frequency signal having a center frequency;

automatic frequency control means for controlling the intermediate-frequency signal from said optical detection means such that the center frequency of the intermediate-frequency signal is held constant;

sweep means for monitoring one of a presence and an absence of the intermediate-frequency signal output from said optical detection means and sweeping at least one of a frequency of the signal light and a frequency of the local light;

decision means for stopping the sweep of the frequency by said sweep means upon detecting that the intermediate-frequency signal is output from said optical detection means and determining a relative frequency position between the signal light and the local light, the relative frequency position being indicative of which one of the frequency of the signal light and the frequency of the local light is higher than the other one;

correction means for correcting at least one of the frequency of the signal light and the frequency of the local light when the relative frequency position determined by said decision means is different from a predetermined relative frequency position; and automatic frequency control on/off control means for selectively switching said automatic frequency control means between an operating state and a nonoperating state, switching said automatic frequency control means from the nonoperating state to the operating state upon when one of the relative frequency position determined by said decision means is in agreement with the predetermined relative frequency position and said at least one of the frequency of the signal light and the frequency of the local light is corrected by said correction means.

2. A cold start control system according to claim 1, wherein:

said automatic frequency control means controls the frequency of the local light in order to maintain the center frequency of the intermediate-frequency signal from said optical detection means constant;

said sweep means sweeps the frequency of the local light; and said correction means corrects the frequency of the local light.

3. A cold start control system according to claim 2, wherein said predetermined relative frequency position is such that the frequency of the local light is lower than the frequency of the signal light, and said sweep means sweeps the frequency of the local light from a low-frequency side to a high-frequency side.

4. A cold start control system according to claim 3, wherein the frequency of the local light is swept uncontinuously by using discrete values at regular intervals.

5. A cold start control system according to claim 3, further comprising:

a laser diode supplying the local light in dependence upon a bias current; and said automatic frequency control means controlling the bias current for said laser diode.

6. A cold start control system according to claim 5, wherein said sweep means first sweeps the bias current for said laser diode and, when the intermediate-frequency signal is not detected by the sweep of the bias current, said sweep means sweeps the temperature of said laser diode.

7. A cold start control system according to claim 6, wherein:

said laser diode has an active layer and three electrodes divided along a length of the active layer;

said sweep means sweeps the bias current which is supplied to the center electrode of said three electrodes; and said automatic frequency control means controls the bias current supplied to the center electrode.

8. A cold start control system according to claim 6, wherein said automatic frequency control means comprises a frequency discriminator having a limited frequency discriminating range.

9. A cold start control system according to claim 8, wherein:

said decision means comprises;

means for decreasing the bias current for said laser diode such that the frequency of the local light is increased by the frequency corresponding to approximately one half of the frequency discriminating range of said frequency discriminator, detection means for detecting a first output level of the intermediate-frequency signal and a second output level of said frequency discriminator, and comparison means for comparing the first and second output levels to first and second predetermined threshold values, respectively; and said correction means comprises means for increasing the bias current for said laser diode such that the frequency of the local light is decreased by the frequency corresponding to the result of the two comparisons in said comparison means.

10. A cold start control system according to claim 8, wherein:

said decision means comprises:

means for bringing said automatic frequency control means temporarily into the operating state, means for detecting the output level of the intermediate-frequency signal, means for comparing the detected output level with a predetermined threshold value, and means for bringing said automatic frequency control means into the nonoperating state when the detected output level is larger than the predetermined threshold value; and said correction means comprises means for varying the bias current for said laser diode after bringing said automatic frequency control means into the nonoperating state when the detected output level is smaller than the predetermined threshold value.

11. A cold start control system according to claim 8, wherein said sweep means comprises:

means for sweeping the bias current for said laser diode from an upper limit to a lower limit of a variable range of the bias current with the temperature of said laser diode fixed to a center value of a variable range of the temperature;

means for sweeping the temperature of said laser diode from the center value to the lower limit of the variable range of the temperature with the bias current for said laser diode fixed to the lower limit of the bias current; and means for sweeping the temperature of said laser diode from the upper limit to the center value of the variable range of the temperature with the bias current for said laser diode fixed to the upper limit of the bias current.

12. A cold start control system according to claim 8, wherein, after said automatic frequency control means is brought into the operating state, the temperature of said laser diode is reset such that the bias current for said laser diode is brought virtually to a center value of a variable range of said laser diode.

13. A cold start control system according to claim 12, wherein the reset of the temperature of said laser diode is carried out while said automatic frequency control means is in the operating state.

14. A cold start control system according to claim 8, further comprising:

means for varying the temperature of said laser diode; and means for confirming a plurality of times that the temperature variation of said laser diode is within a predetermined range when the temperature of said laser diode is varied.

15. A cold start control system according to claim 8, further comprising:

means for determining when the signal light is blocked from said optical detection means and reproducing driving conditions of said laser diode existing at a predetermined period of time before the blockage of the signal light.

16. A cold start control method for use in a coherent lightwave communications system in which received signal light is mixed with local light to obtain an intermediate-frequency signal having a center frequency, said cold start control method comprising the steps of:

sweeping at least one of a frequency of the local light and a frequency of the signal light;

determining a relative frequency position, indicative of which one of the frequency of the signal light and the frequency of the local light is higher than the other one, between the local light and the signal light when the intermediate-frequency signal is detected;

correcting at least one of the frequency of the local light and the frequency of the signal light when the relative frequency position obtained in said step of determining a relative frequency is different from a predetermined relative frequency position; and starting automatic frequency control when the relative frequency position obtained in said determining step is one of in agreement with the predetermined relative frequency position and the correction of the frequency of said at least one of the frequency of the signal light and the frequency of the local light to be corrected is made in said correcting step.

17. A cold start control method according to claim 16, wherein the frequency of the local light is swept in said sweeping step, and the frequency of the local light is controlled such that the center frequency of the intermediate-frequency signal is held constant in said automatic frequency control.

\* \* \* \* \*

UNITED STATES PATENT AND TRADEMARK OFFICE
CERTIFICATE OF CORRECTION

PATENT NO. : 5,471,336

DATED : November 28, 1995

INVENTOR(S) : Hiroshi ONAKA et al.

It is certified that error appears in the above-indentified patent and that said Letters Patent is hereby corrected as shown below:

Column 2, line 2, after "light" insert –,–.

Column 4, line 48, after "Therefore" insert –,–.

Column 5, line 33, delete "e*"; and line 50, change ";" to –,–.

Column 6, line 1, delete "of".

Column 7, line 57, after "variable" insert –,–.

Column 9, line 66, delete "number of".

Column 10, line 54, after "tively" insert –,–.

Column 13, line 38, change "values" to –value,–.

UNITED STATES PATENT AND TRADEMARK OFFICE
CERTIFICATE OF CORRECTION

PATENT NO. : 5,471,336
DATED : November 28, 1995
INVENTOR(S) : Hiroshi Onaka, et. al.

It is certified that error appears in the above-indentified patent and that said Letters Patent is hereby corrected as shown below:

Column 15, line 41, change "Step" to --step--.

Signed and Sealed this

Twelfth Day of March, 1996

Attest:

BRUCE LEHMAN

Attesting Officer    Commissioner of Patents and Trademarks